United States Patent
Stacy et al.

(10) Patent No.: US 10,891,408 B2
(45) Date of Patent: Jan. 12, 2021

(54) SYSTEMS AND METHODS TO DEFINE AND MONITOR A SCENARIO OF CONDITIONS

(75) Inventors: E. Webb Stacy, Andover, MA (US); John Colonna-Romano, Stow, MA (US)

(73) Assignee: Aptima, Inc., Woburn, MA (US)

( * ) Notice: Subject to any disclaimer, the term of this patent is extended or adjusted under 35 U.S.C. 154(b) by 806 days.

(21) Appl. No.: 13/502,120

(22) PCT Filed: Nov. 4, 2010

(86) PCT No.: PCT/US2010/055525
§ 371 (c)(1),
(2), (4) Date: Apr. 13, 2012

(87) PCT Pub. No.: WO2011/057026
PCT Pub. Date: May 12, 2011

(65) Prior Publication Data
US 2012/0208152 A1    Aug. 16, 2012

Related U.S. Application Data

(60) Provisional application No. 61/258,236, filed on Nov. 5, 2009.

(51) Int. Cl.
| | | |
|---|---|---|
| *G09B 19/00* | (2006.01) | |
| *G06F 30/20* | (2020.01) | |
| *G06F 111/04* | (2020.01) | |
| *G09B 19/02* | (2006.01) | |
| *G09B 23/02* | (2006.01) | |
| *G09B 23/00* | (2006.01) | |

(52) U.S. Cl.
CPC ............. *G06F 30/20* (2020.01); *G09B 19/00* (2013.01); *G06F 2111/04* (2020.01); *G09B 19/02* (2013.01); *G09B 23/00* (2013.01); *G09B 23/02* (2013.01)

(58) Field of Classification Search
CPC ......... G09B 19/02; G09B 19/00; G06F 30/20; G06F 2111/04
USPC ....................................................... 434/188
See application file for complete search history.

(56) References Cited

U.S. PATENT DOCUMENTS

| | | | |
|---|---|---|---|
| 5,148,365 A | * | 9/1992 | Dembo ................. G06Q 10/06 705/36 R |
| 5,544,281 A | | 8/1996 | Maruoka et al. |

(Continued)

OTHER PUBLICATIONS

Korean Intellectual Property Office, International Search Report and Written Opinion for co-pending PCT Application PCT/US2010/055525, dated Aug. 2, 2011.

(Continued)

*Primary Examiner* — James B Hull
(74) *Attorney, Agent, or Firm* — John J. Brooks, III

(57) ABSTRACT

Systems and methods to define a scenario of conditions comprising the steps of defining at least one condition for at least one educational objective, the at least one condition being represented by a constraint and scheduling the conditions into a scenario of conditions. In some embodiments, the scheduling is performed by analyzing the constraints using constraint programming. In some embodiments, the constraints comprise mathematical or computational constraints representing a range of variables. Also disclosed are systems and methods to monitor a scenario of conditions.

13 Claims, 22 Drawing Sheets

(56) References Cited

U.S. PATENT DOCUMENTS

| | | |
|---|---|---|
| 6,496,110 B2 * | 12/2002 | Peterson et al. ............... 340/522 |
| 7,249,047 B2 | 7/2007 | Arguello et al. |
| 2002/0198753 A1 * | 12/2002 | Feldman et al. .................. 705/7 |
| 2004/0006566 A1 | 1/2004 | Taylor et al. |
| 2005/0216324 A1 | 9/2005 | Maithell et al. |
| 2005/0268063 A1 | 12/2005 | Diao et al. |
| 2005/0278301 A1 | 12/2005 | Castellanos et al. |
| 2007/0257903 A1 * | 11/2007 | Gutierrez et al. ............ 345/419 |
| 2007/0261012 A1 | 11/2007 | Matsuda et al. |
| 2008/0183520 A1 * | 7/2008 | Cutts ...................... G06Q 10/06 705/7.36 |
| 2008/0183538 A1 | 7/2008 | Hamadi et al. |
| 2008/0195451 A1 | 8/2008 | Abram |
| 2008/0254425 A1 | 10/2008 | Cohen |
| 2009/0043635 A1 | 2/2009 | Mori |
| 2009/0106003 A1 * | 4/2009 | Diehl ..................... G09B 9/003 703/6 |
| 2009/0142742 A1 | 6/2009 | Goldberg |
| 2010/0268651 A1 * | 10/2010 | Raskina ................. G06Q 10/04 705/80 |
| 2010/0323334 A1 * | 12/2010 | Goforth et al. ............... 434/219 |

OTHER PUBLICATIONS

E. Webb Stacy, Melissa Walwanis Nelson and John Colonna-Romano, "Using Pedagogical Information to Provide More Effective Scenarios", Interservice/Industry Training, Simulation, and Education Conference (I/ITSEC) 2007, Dec. 2007, 2007 Paper No. 7107, Orlando, FL, USA.

* cited by examiner

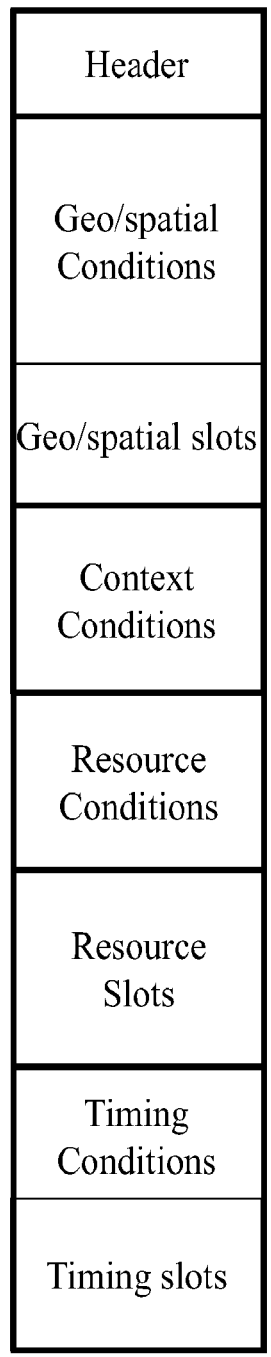
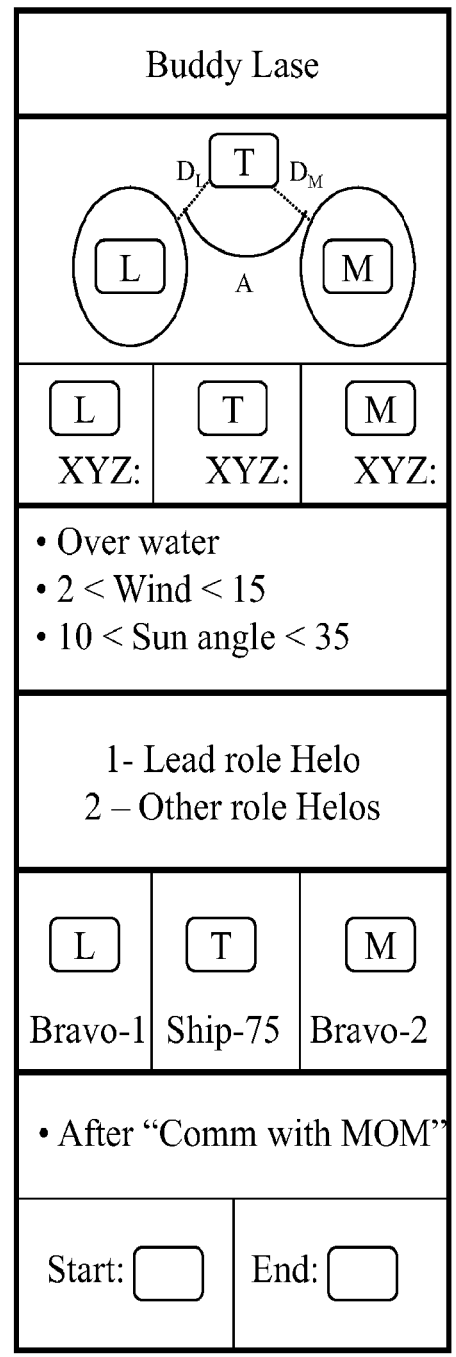
FIG. 7

FF - fly in formation
s1 - deploy sensor 1
s2 - deploy sensor 2
sf - sensor fusion
CM - communicate with MOM
sbl – setup buddy lase
bl - buddy lase
dm - deploy missile
fm - fire missile

SYSTEMS AND METHODS TO DEFINE AND MONITOR A SCENARIO OF CONDITIONS

CROSS-REFERENCE TO RELATED APPLICATIONS

This application a U.S. National Stage application of International Application No. PCT/US2010/055525, filed on Nov. 4, 2010 and entitled "SYSTEMS AND METHODS TO DEFINE AND MONITOR A SCENARIO OF CONDITIONS" which the benefit of U.S. Provisional Application Ser. No. 61/258,236 to Webb Stacy et al., filed on 5 Nov. 2009 and entitled "SYSTEMS AND METHODS TO DEFINE EDUCATIONAL SCENARIOS", the entire contents of which both are herein incorporated by reference.

STATEMENT REGARDING FEDERALLY SPONSORED RESEARCH OR DEVELOPMENT

This invention was made with Government support under Contract #N61339-08-C-0017 awarded by the U.S. Navy. The Government has certain rights in the invention.

REFERENCE TO SEQUENCE LISTING, A TABLE, OR A COMPUTER PROGRAM LISTING COMPACT DISC APPENDIX

Not Applicable.

BACKGROUND OF THE INVENTION

1. Field of the Invention

This invention relates to simulated environments, in particular to simulation environments that utilize scenarios.

2. Description of the Prior Art

Immersive scenarios, such as those found in military exercises and computer-based games, are often viewed as a sequence of discrete partially scripted events. In military exercises, these may be found in a planning document called the Master Scenario Events List (MSEL). Each scripted MSEL event involves specific conditions and actions by specific live, virtual, or constructive entities, and the conditions and actions take place at specific virtual locations at specific scenario times. Computer-based games are scripted similarly.

Current scenario definition languages have been designed to provide high fidelity detail but generally fail to define clearly the linkages between scenario events and training objectives.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented at the end.

It is an object of one embodiment of the systems and methods to determine and monitor a scenario of conditions to provide a way to view scenarios comprising a partially ordered collection of partially specified conditions and actions by relaxing these scenario conditions (when possible) in order to gain flexibility in sequencing, scheduling, positioning, monitoring and replaying scenario events or conditions. In some embodiments, the scenario defining and monitoring system includes: a pedagogically sound scenario definition language; a scenario authoring tool; a scenario analysis tool to determine the feasibility of scenarios; and a decision support tool for trainers, systems or operators to monitor performance, give condition satisfaction status and provide corrective guidance while encountering scenario conditions or events such as a group of conditions or a series of conditions.

It is an object of one embodiment of the invention to provide a method of defining a scenario of conditions, said method comprising the steps of defining a plurality of conditions for at least one objective, the plurality of conditions being represented by at least one constraint and scheduling the conditions into a scenario of conditions. In some embodiments, the at least one constraint is a mathematical expression representing at least one variable, the step of scheduling the plurality of conditions into a scenario of conditions comprises optimizing the objective using constraint programming or the objective is an educational objective. The step of scheduling the plurality of conditions into a scenario of conditions can also comprise satisfying the objective using constraint programming.

It is an object of other embodiments of the invention to provide a method of defining a scenario of conditions wherein a value of the at least one variable is defined by an entity, a resource or the value is a priority.

It is an object of one embodiment of the invention to provide a method of monitoring a user on a scenario of conditions comprising presenting a scenario of conditions to a user, the scenario of conditions comprising a plurality of conditions for at least one objective, the plurality of conditions being represented by at least one constraint, monitoring an execution of the user of at least one condition, creating at least one actual condition of the scenario of conditions based on the execution of the user, and communicating the measure actual condition. In some embodiments, the constraint is a mathematical expression that represents a range of variables, the objective is an educational objective or one of the conditions is one of a plurality of 3D geographic locations of an entity.

It is another object of some embodiments to provide a method of monitoring a user on a scenario of conditions wherein the scenario is changed dynamically during the execution of the user based on the actual condition, the scenario of conditions is changed dynamically during the execution of the user based on a second actual condition of an execution of a second user or the scenario of conditions is changed by optimizing a plurality of the constraints using constraint programming.

It is an object of one embodiment of the invention to provide a computer based system for defining a scenario of conditions comprising a means to receive a plurality of conditions for at least one objective, the plurality of conditions being represented by at least one constraint and a means to automatically schedule the conditions into a scenario of conditions. In some embodiments, the constraint is a mathematical expression and the means to automatically schedule the conditions into a scenario of conditions comprises optimizing the constraints using constraint programming. In some embodiments, the objective is an educational objective.

It is another object of embodiments of the invention to provide a method of monitoring a user on a training scenario comprising the steps of presenting a training scenario to a user where the training scenario comprising at least one condition for at least one training objective and the at least one condition being represented by a constraint, monitoring a user's performance following the training scenario, creating condition satisfaction measures of the user's performance against the conditions and comparing the condition satisfaction measures to the conditions.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 7 illustrates one embodiment of a training objective template and a training objective example;

FIG. 20 illustrates a functional overview of one embodiment of constraint programming logic;

DETAILED DESCRIPTION OF THE INVENTION

Methods of defining a scenario of conditions, such as educational and training scenarios, as well as computer based scenario defining systems will now be described in detail with reference to the accompanying drawings. It will be appreciated that while the following description focuses on methods and systems that define and monitor educational and training scenarios, the systems and methods disclosed herein have wide applicability. For example, the methods and systems described herein may be readily employed with project planning or task/resource allocation as well as any educational system such a specifically programmed computer based learning system. Notwithstanding the specific example embodiments set forth below, all such variations and modifications that would be envisioned by one of ordinary skill in the art are intended to fall within the scope of this disclosure.

Current scenario definition methods provide detail for discrete, precisely specified events or conditions planned to occur during the scenario but generally fail to define clearly the linkages between scenario events or conditions and training objectives. This is particularly true for high-fidelity scenarios. One embodiment of the scenario defining and monitoring systems, termed PRESTO (Pedagogically Relevant Engineering of Scenarios for Training Objectives) as used herein is based on an alternate way to view scenarios. In this view, scenarios consist of a partially ordered collection of partially specified conditions and actions by live, virtual, or constructive entities, and the conditions and actions take place with partially specified location and timing constraints. In other words, PRESTO technology exploits the relaxation of scenario specifics (when possible) in order to gain flexibility in sequencing, scheduling, positioning and replaying scenario events or conditions.

In particular, the PRESTO embodiment includes: a pedagogically sound scenario definition language; a scenario authoring tool; a scenario analysis tool to determine the feasibility of scenarios; and a decision support tool for trainers, systems or operators to monitor performance, give condition satisfaction status and provide corrective guidance while encountering scenario conditions or events such as a group or series of conditions.

Figure 1A:
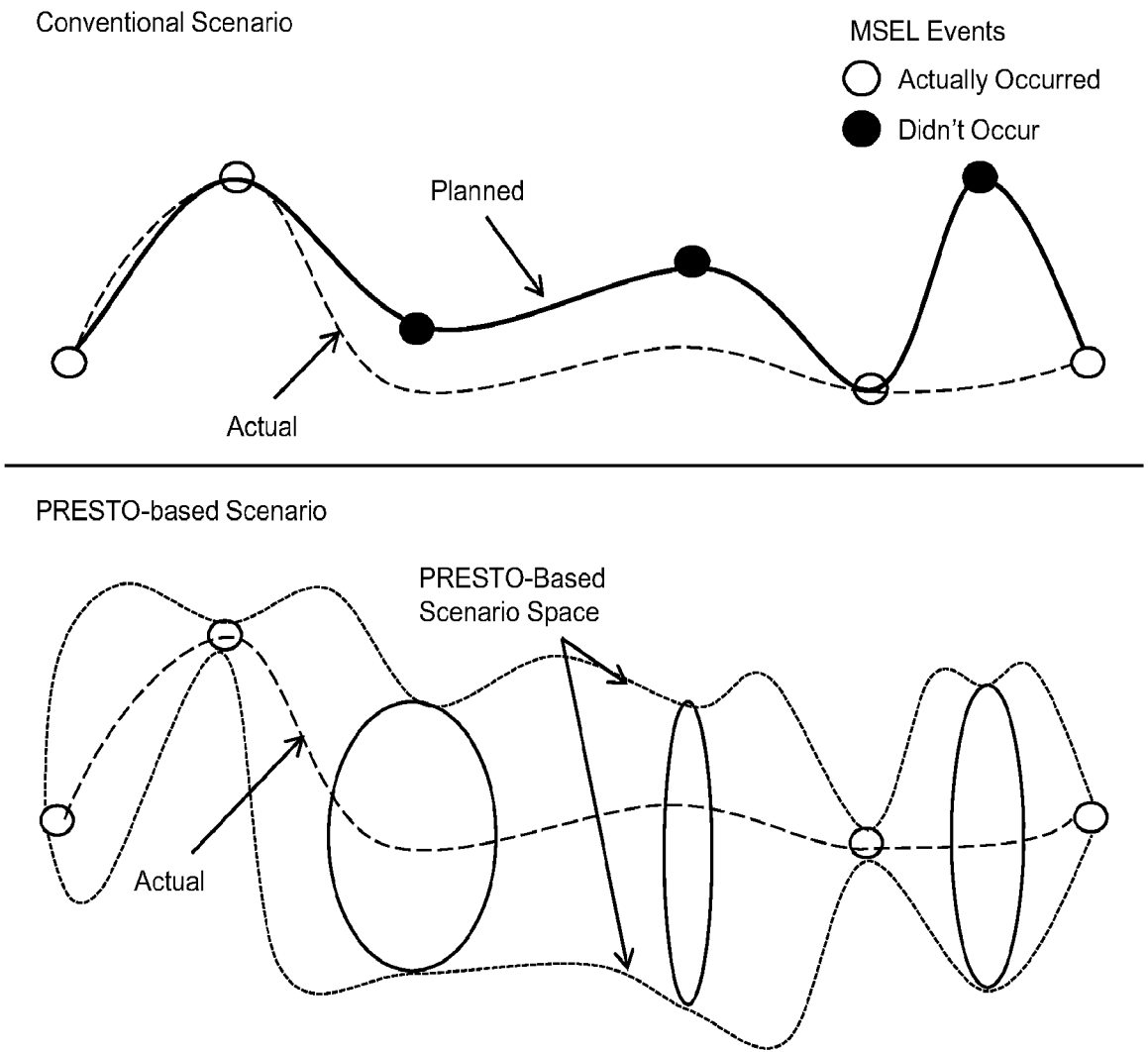
FIG. 1A illustrates a conceptual comparison of a conventional scenario compared to a training scenario defined by embodiments of the disclosed methods.

FIG. 1A illustrates some of these differences. In conventional, Master Scenario Events List (MSEL) based scenarios, the ovals show a planned set of highly specific scenario events. In PRESTO-based scenarios, some events are equally specific, but some are not. The relaxed event specifications are shown by the different sized ovals. In the conventional scenario, circumstances can often make it impossible for the actual sequence of events to match the planned sequence of events, but PRESTO-based scenarios provide wider latitude for accommodating the unexpected. For example, suppose a MSEL-based scenario requires that a trainee be at a location 223.656, 194.331 at time t=32.54. A PRESTO-based scenario might relax those conditions and simply require that the trainee be within 1 mile of that position at some time after t=10 but before t=75. If unexpected events make it impossible to meet the MSEL-based requirements, there is still a chance that the PRESTO-based requirements can be met, because they are considerably less demanding although still pedagogically rigorous.

By using mathematical or other computational expressions to model aspects of scenarios and conditions, tools such as constraint programming can be used as a means to automatically define the scenarios. For example, training scenarios including training objectives, conditions or preconditions of training objectives, can be modeled with tools such as constraint programming to schedule training activities. Constraint programming can be used as a means to solve constraint satisfaction problems such as defining scenarios to satisfy all the conditions. Constraint programming can also be a means to solve constraint optimization problems such as defining the optimal scenario of conditions. In addition, the use of mathematical expressions as models provides helpful tools that can be used to monitor, manage and optimize the progress of a user through the training scenario.

This approach differs from earlier work in constraint programming in that it is focused on attempting to schedule conditions that can optimize a set of events such as working on training objectives or advancing the plot line, and not on maximizing the throughput of a system, as would be the case for job-shop or workflow applications. In particular, the application of constraint programming to training, educational, and entertainment-based situations is unique in that the focus is on optimizing events rather than on optimizing the performance of the system. Here, the nature of the optimization—the objective function—could be address any of a multiplicity of things. For example, with this approach it is possible to address a variety of goals such as minimizing the length of the scenario, maximizing the number of training objectives, maximizing a certain number of conditions required for each event, maximizing the total value of all events given a value for each event, and a large number of other sensible goals. As used above, and throughout this description, an event can be one or more conditions within a scenario.

One Embodiment of Methods to Define Training Scenarios:

One embodiment of methods to define scenarios is illustrated by the PRESTO system (also "PRESTO") which focuses on the key conditions of the scenario experiences that must be met to provide the needed context for a trainee to train. With the conditions satisfied, other factors of the experience can vary as needed to provide flexibility in the events of the scenario while still satisfying the training objectives. The PRESTO system can be used during scenario development to analyze a scenario for feasibility and during the training exercise to support the trainer/operator to bring about the conditions which will give the trainees the most effective training experience. PRESTO allows trainers to create training objective focused scenarios more quickly than conventional methods. The scenarios defined are more flexible in providing the situations needed to achieve the training goals.

Figure 1B:
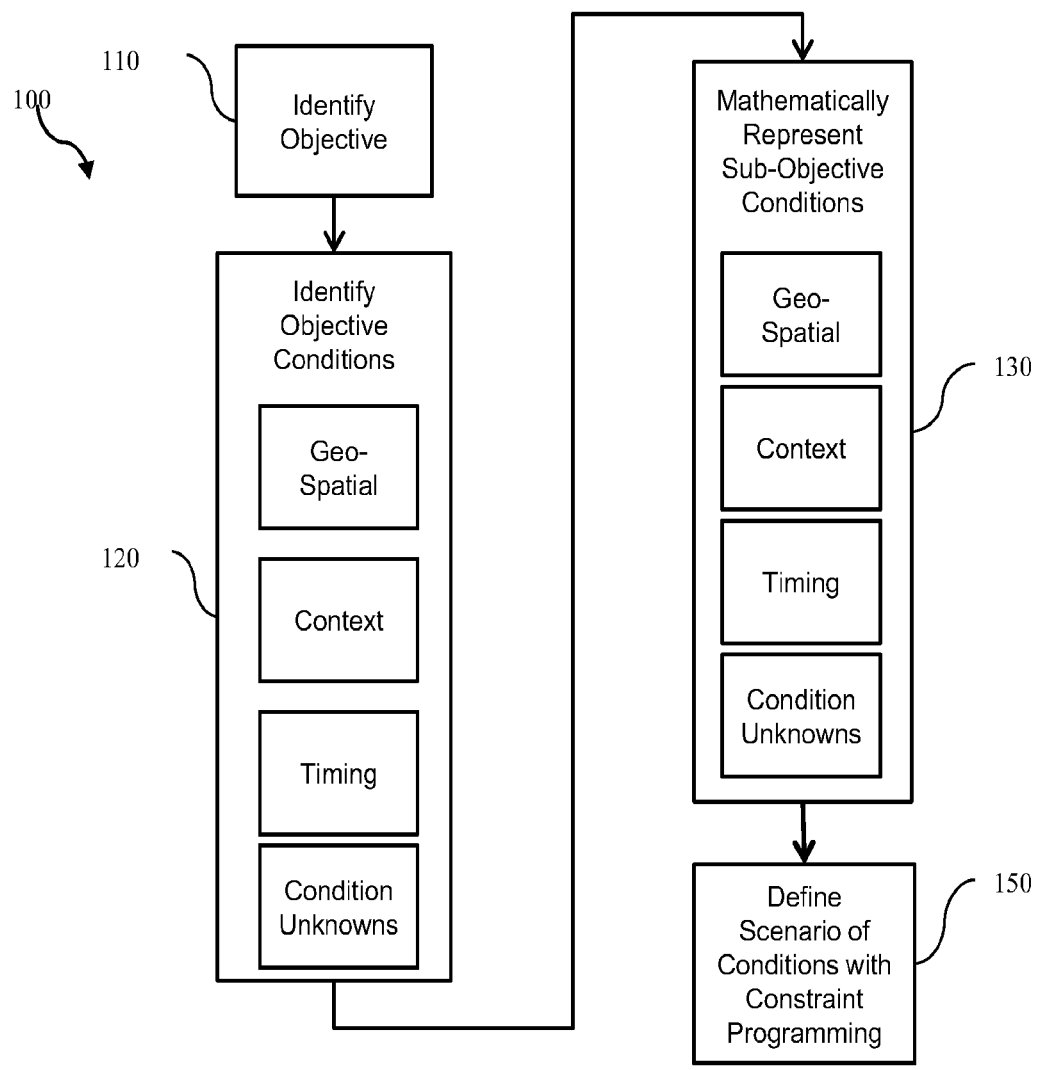
FIG. 1B illustrates a general flow chart of one embodiment of methods to define a scenario of conditions with unknowns.
Figure 1C:
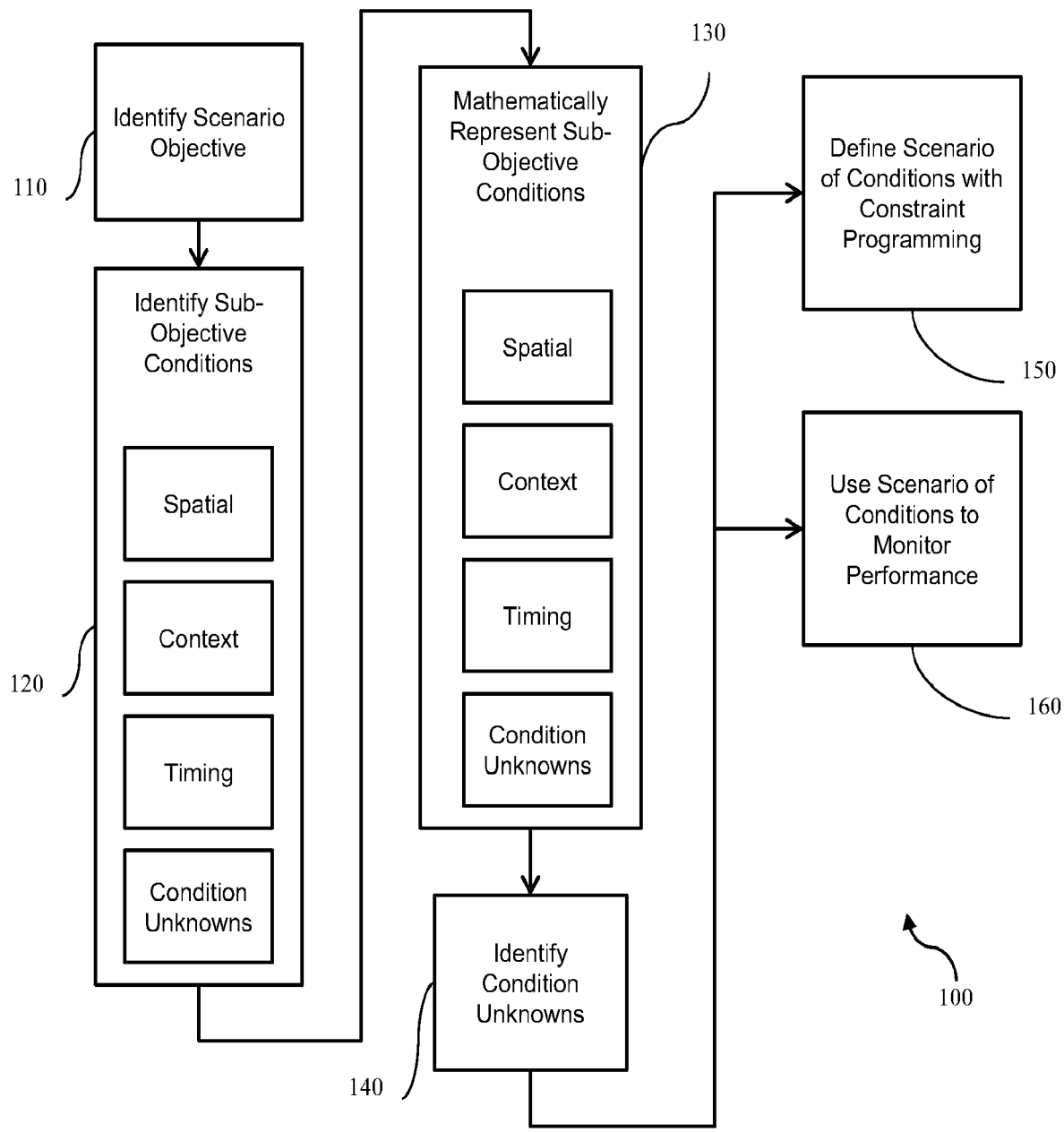
FIG. 1C illustrates a general flow chart of one embodiment of methods to define a scenario of conditions with unknowns identified.

In general, the methods of the defining a scenario of conditions is shown in FIGS. 1B and 1C. As shown in FIG. 1B, the method embodiment 100 comprises identifying at least one objective at 110, identify objective conditions at 120, mathematically representing the objective conditions at 130 and defining a scenario of conditions with constraint programming at 150. The result of this is a scenario of conditions using constraint programming that can be used to generate scenarios compliant with objective. This embodiment represents objective conditions that have mathematical unknowns which can be represented by a range of unknown values.

FIG. 1C illustrates one embodiment of the methods of defining a scenario of conditions 100 where the objective is a scenario objective with sub-objectives and the constraints are at least partially populated with unknown values. An example of this embodiment would be a scenario objective to train a group of trainees on several sub-objectives (e.g. tasks) and each of these tasks has their own conditions. The conditions are mathematically represented and the unknowns within the conditions are identified at 140. These unknowns (e.g. task priority) can populate the conditions to define a scenario of conditions at 150 or the unknowns (e.g. actual task accomplishment) can populate the conditions and scenarios so that performance against the conditions can be monitored or rescheduled at 160.

As referred to in FIGS. 1B and 1C and throughout this description, a condition is any type of constraint or requirement used to define an objective and help determine whether the objective is met. For example and not for limitation, a condition may be whether an entity is present, what skills an entity has, what speed the entity is traveling and to what degree an objective has been met. By representing these types of objective conditions as mathematical constraints, it is possible to represent the conditions more flexibly, such as in a mathematical range, that can more accurately represent methods to meet the objective or to better satisfy a group of objectives. As referred to in FIG. 1C and throughout this description, an unknown is a value or other representation of a variable that is used within a condition or constraint. For example and not for limitation, an unknown may be the priority of a training objective, estimated resource values or identification of an entity to be trained through a scenario as well as traits or properties of this trainee or the equipment they work with in the scenario.

Embodiments of these methods can also include monitoring the actual scenario conditions to populate condition unknowns and determine which objectives have conditions fully satisfied (in the constraint range) or partially satisfied (in the constraint range), and which planned objectives are no longer possible (outside of the constraint range) given actual events (other conditions and/or constraints) that have transpired during the scenario. In these types of situations, condition unknowns can further include performance data captured during an actual training session such as location, timing, condition satisfaction measures or any other information that can be used with the system conditions and constraints.

Embodiments can also include modifying objective conditions to reflect variable conditions or constraints such as the existing skills of one trainee as compared to another trainee or varying priorities of objectives desired.

Embodiments can also include conditions for emergent objectives. For example, in the context of training objectives, emergent training objectives are not planned, in the sense that the scenario would not attempt to bring them about, but that nevertheless occur during the course of actually executing the scenario. PRESTO can recognize such "teachable moments" and present alert scenario personnel such as instructors that they have occurred.

PRESTO uses a number of data items to facilitate scenario planning, training objective management and optimization. Although Human Performance Markup Language (HPML), an XML-schema based language for describing human performance in simulators, is not necessary for all embodiments, it is useful, and it contains the major data structures used in some embodiments of PRESTO. The top-level elements may be seen in FIG. 2: scenario entities; scenario element; instances of training objectives (TO Instances) accommodated by the scenario; scenario information system configuration; and a library of predefined training objectives, conditions, resources and performance measurements that can be used in the scenario. These top level elements are used to identify and sometimes provide values for the objective conditions.

Figures 2, 3:
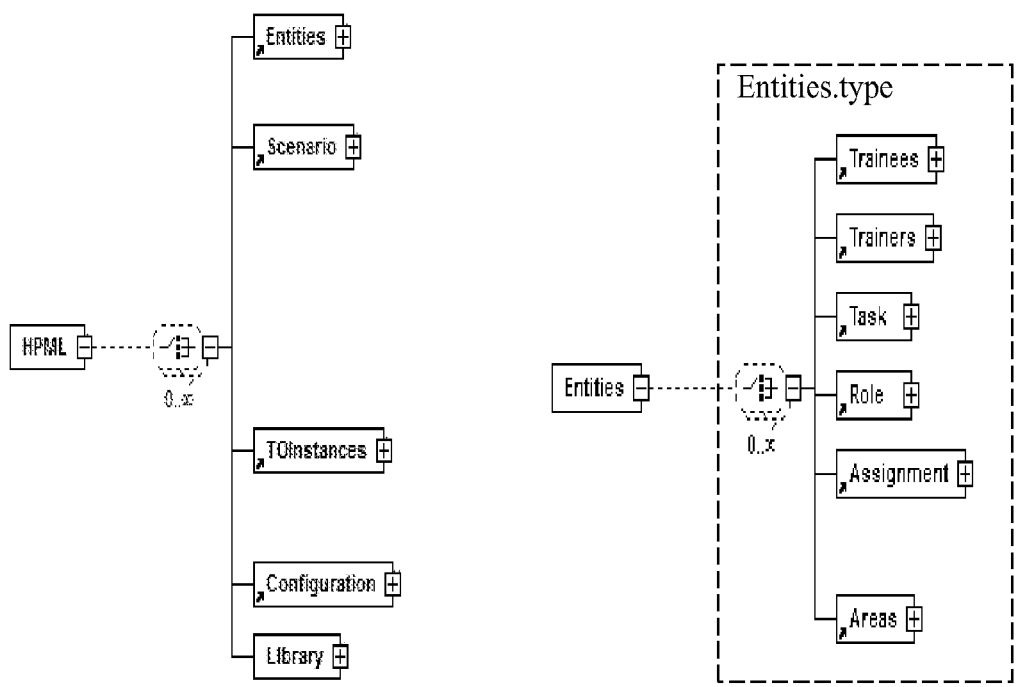
FIG. 2 illustrates one embodiment of the top-level elements of Human Performance Markup Language (HPML) used by PRESTO.
FIG. 3 illustrates one embodiment of the Entity elements used by PRESTO.

Scenario entities describe the entities in the scenario, as may be seen in FIG. 3. The entities provide values for condition unknowns. For example, with PRESTO, there are five elements that describe scenario entities: Trainees—the individuals and teams being trained; Trainers—the people and systems doing the training. In addition to instructors, this element also includes simulators and SAF applications; Tasks—the work to be assigned to the trainees; Roles—the roles that trainees or trainers may take on in performing a task; Assignment—the pairing of an actor (trainee or trainer) with a task and role; and Areas—places where training activity will take place which could specify a specific location, or a range of locations.

Figure 4:
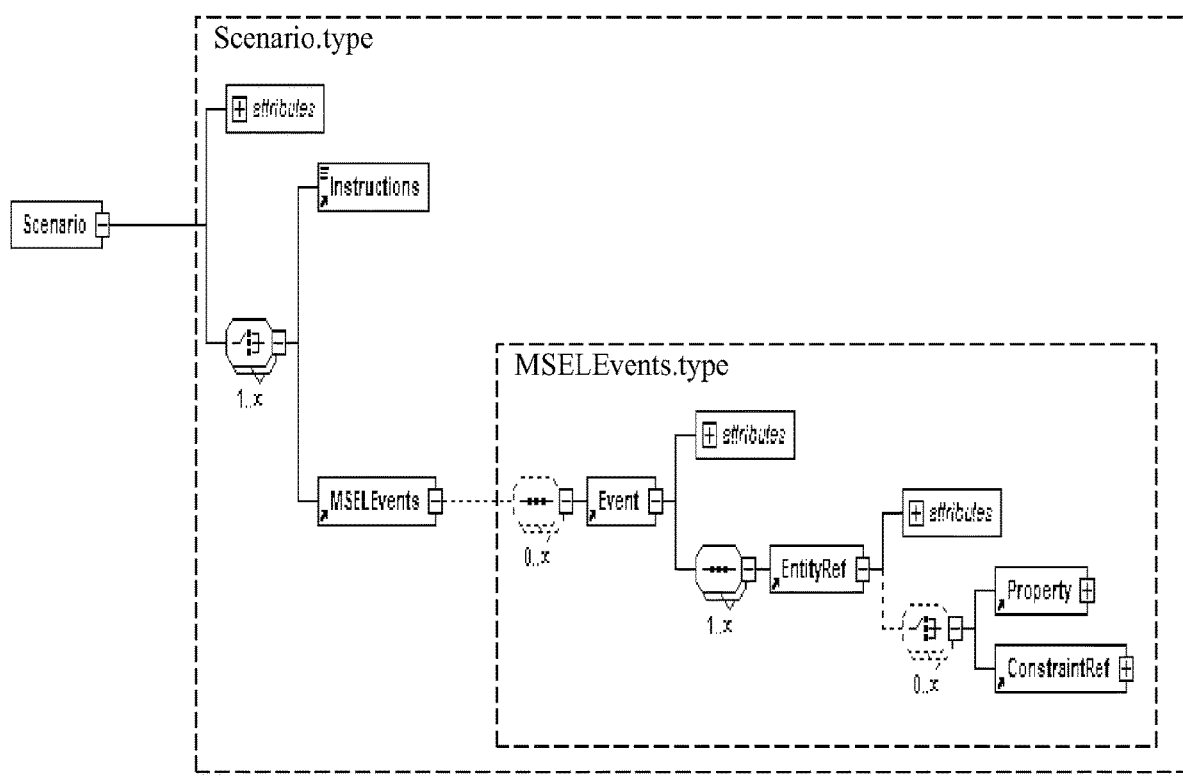
FIG. 4 illustrates one embodiment of the Scenario element used by PRESTO.

The scenario element holds any pre-existing descriptions of the scenario, independent of to-be-scheduled training objectives, as can be seen in FIG. 4. This information includes the instructions given to scenario participants as well as information that described any pre-existing conditions in the scenario such as a Master Scenario Events List (MSEL).

The configuration element provides utility information used to connect PRESTO or other external systems to the available electronic data. Real-time data from the simulation environment provides PRESTO with the current state of the simulation environment so that monitoring and analysis can be done. Real-time data is provided periodically and contains information such as the following: time stamp—the time the data was observed; entity id—the identification of the entity that was observed; location—the location of the entity at the time it was observed; flight angles—pitch, roll and heading of the entity; velocity—the current speed of the entity; altitude—the current altitude of the entity; and activities such as deploying a sensor or firing a weapon.

Figure 6:
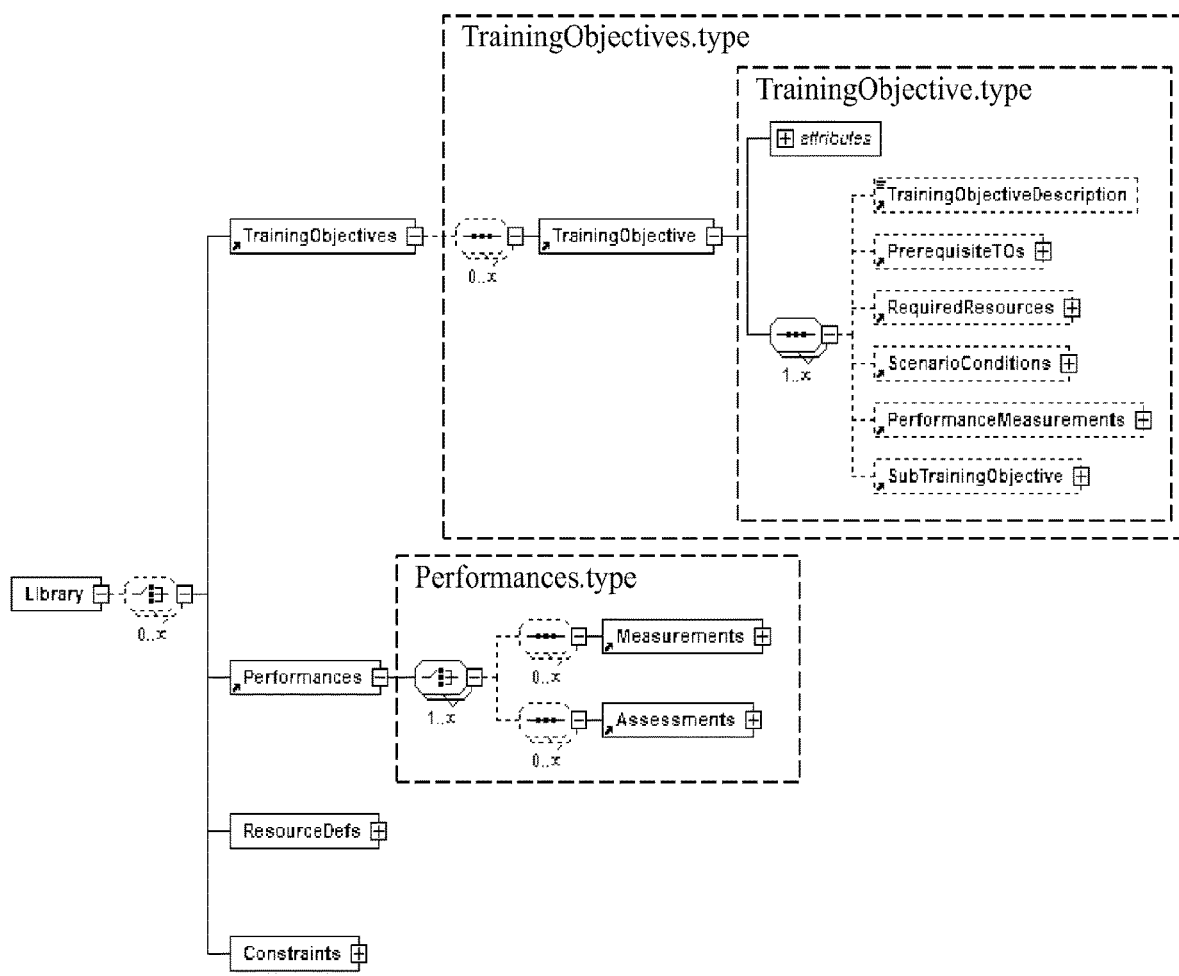
FIG. 6 illustrates one embodiment of the Library element used by PRESTO.

The library element contains information that can be applied to a wide variety of situations, and includes information such as training objectives, performance measurements and assessments, resource definitions, and constraints used by the PRESTO scheduler, as shown in FIG. 6. A training objective identifies the purpose of a specific piece of training and includes a bundle of information defining conditions or requirements that come into play when the trainee works on it, including prerequisites, required resources, scenario preconditions, applicable performance measurements and assessments, and, if necessary, subordinate training objectives that contain the same information about a portion of the overall training objective. The training objective described here can be thought of as a template that describes all of the conditions that are necessary for a trainee to make progress on that training objective. The training objective template contains "slots" which represent unknowns in a constraint and usually can be represented as variables in a mathematical or computational representation of the constraint. The slots are filled in (if possible) with values before or as the PRESTO processing proceeds in order to make a training objective instance have specific values.

Figure 5:
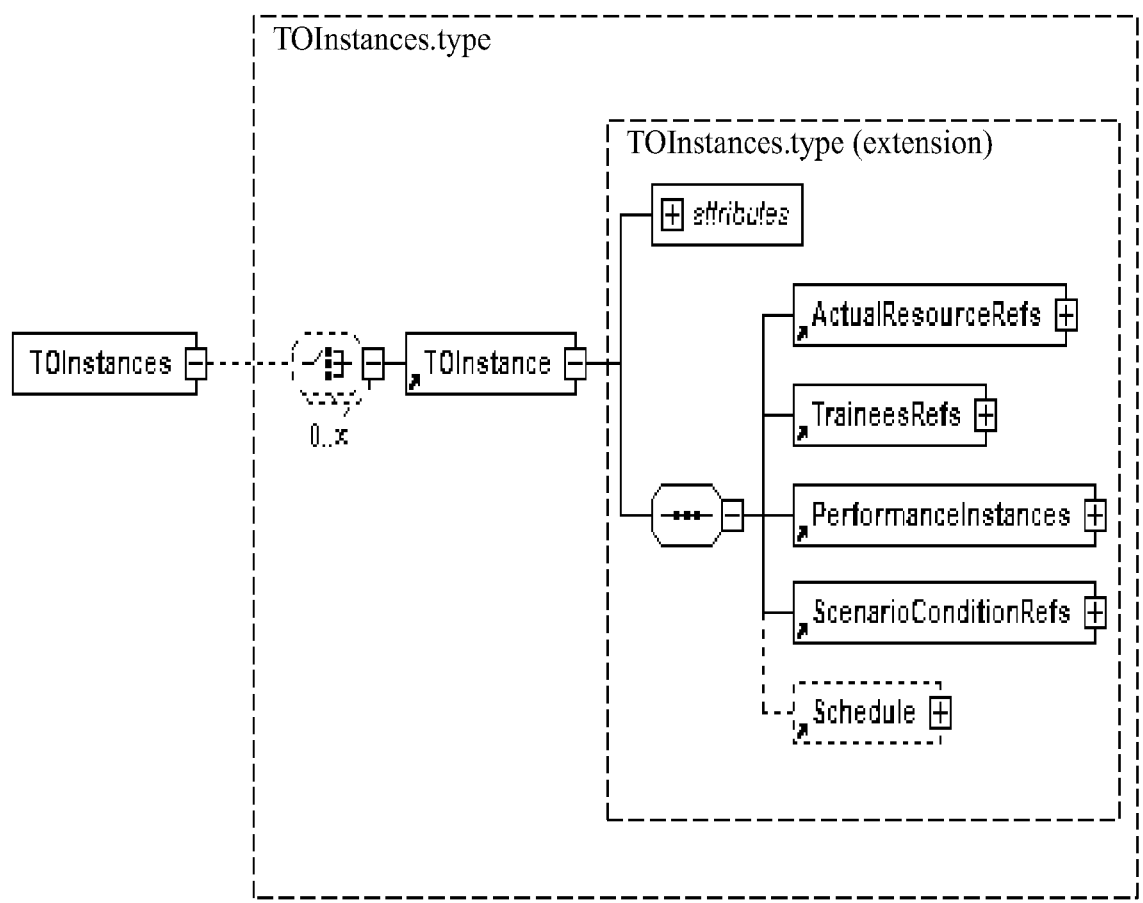
FIG. 5 illustrates one embodiment of the Training Objective Instances element used by PRESTO.

For the PRESTO embodiment, training objectives instances are used to define potential or actual training objectives populated with some or all of their unknowns. As the training objectives (also TOs) represent specific events or tasks to be trained and the conditions associated with specific training objectives, training objective instances (also TO Instances) represent partially or fully populated training objectives with data for the unknowns. Since the specific training objectives can be instantiated differently or for multiple times for training exercises or scenarios and for different entities, these training objective instances are used to describe how the training objective is to be used for that instance (for example that trainee) in the scenario, as shown in FIG. 5. Example information describing the training objective instance itself can be such information as the resources involved, the trainees involved, the performance measures that will be used to measure and assess trainee performance, and any special scenario conditions required by this particular instance.

When a trainee is assigned a training objective, additional data can be provided to provide the unknowns that help describe the training objectives a trainee should work on. For the PRESTO embodiment, this data includes information such as the priority and role for the trainee. The trainee training needs data consists of a list of data items with the following content: trainee—an identifier of the trainee this training needs data applies to; training objective—the training objective the trainee should work on; priority—a priority for the trainee for this training; and objective role—the role in this training objective that the trainee should experience.

The above data can be provided for each entity in the scenario (SAFs and trainees). Other simulation environment data is also obtained such as time of day and weather conditions.

The above conditions and data can be represented by a mathematical constraint or other constraint. Most commonly, this is an assertion involving integers: an altitude is greater than a certain (integer) amount, the amount of fuel left is between two (integer) values, and so on. But there is nothing to prevent these constraints from having real-valued or symbolic elements or sets of values, except that certain combinations can be more computationally demanding than others. For example, scenario entities can be represented by sets of capabilities like speed, weapons, and range; other scenario elements such as weather can be represented by an enumeration such as <sunny, partially cloudy, cloudy, precipitating>; locations can be represented by specifying a 3 dimensional distance around a point; airspeed and altitudes can be represented by ranges; and so on.

One type of constraint is a precedence constraint. Precedence constraints specify that one or more events, conditions, or training objectives must be preceded by one or more other events, conditions, or training objectives. The set of precedence constraints defines a partial ordering of the events, conditions, or training objectives in the sense that not all events are ordered with respect to each other. For example, it is important that a missile be fired (an event) before there is a damage assessment event, but this sequence could come either before or after a weather forecast event.

As described below, the use of certain types of constraints allow the conditions and training objectives to be analyzed with tools such as software programs and constraint programming tools.

One goal of PRESTO is to accomplish scenario engineering to increase training opportunities. PRESTO accomplishes this by analyzing training objectives in the context of a scenario either during scenario planning or during training exercise time. One of the processes that PRESTO performs is to determine how to schedule, or "fit", training objectives into either the scenario as it is being planned or into a training exercise as it is being conducted.

To illustrate some of the processes of PRESTO, consider the idea of a training objective as a template (as described above with the training objective). PRESTO processing accomplishes these major activities with respect to training objectives:

instantiate training objectives for the trainee—This involves taking the training objective template for the given training objective and filling in all of the information that is known at this point. We can call these potential training objectives (PTO) because at this point we do not know if the training objective conditions can be satisfied.
  determine values for PTO "slots"—An example of a PTO slot is a variable condition such as the resources needed for the training objective. In the case of an attack situation PTO which requires a target and two aircraft in the area, each of these three resource slots represent a potentially unknown variable of a constraint to be later filled in with a specific trainee or SAF value to satisfy the resource conditions for the PTO.
  optimize—The optimization occurs once the values for the PTO slots are determined or estimated. This is handled by a constraint programming (CP) components of PRESTO and the set of algorithms available in the CP system used by PRESTO.

Because these objectives or conditions can be represented by mathematical constraints, they can be analyzed and modeled using tools such as CP.

To illustrate the above process, consider the training objective example for buddy lasing (a kind of fighter plane attack) shown in FIG. 7. The contents of a training objective template is shows in the left side and the buddy lasing training example is shown on the right side of FIG. 7 illustrating the conditions that must be satisfied and the slots that must be filled in with actual values in order for conditions to be satisfied and the training objective to be realized for the trainee. The slots are the unknowns or variables in the conditions which require values to be assigned to them to determine how they satisfy the constraints or conditions. Given this example, the following can be determined before the trainee can work on this training objective:

A trainee with a buddy lasing training objective would fill the "L" (for laser) resource slot, in this case the trainee is called Bravo-1. A target (resource slot named "T") and another helicopter (resource slot named "M" who would fire a missile) will also need to be identified to fill the other resource slots. In the example T is assigned to the SAF called Ship-75 and M to another trainee called Bravo-2.
  The context conditions will need to be checked against the current conditions of the scenario to make sure they can be met. These conditions have other implications such as Over water which will depend on the location of L, T and M and Sun angle which will depend on the time this training objective is scheduled.
  Timing conditions need to be checked. In this case L cannot work on this training objective unless they have just completed a "Communicate with MOM" training objective. When the PRESTO method is able to schedule this training objective the Start and End time slots are filled in.
  The geometric and spatial conditions must be checked. In this example, these conditions define a geometric configuration between the lasing helicopter ("L"), the target ("T") and the missile firing helicopter ("M"). There is a distance range ("$D_L$" and "$D_M$") specified between each of the entities and also an angle ("A"). For scenario planning purposes these conditions are used to determine where to move entities or where to place them (for example, where to place the target so that the geometry is correct). For scenario monitoring purposes, when the training scenario is running, these conditions determine the pre-conditions for progress on the training objective to commence.

During the running of the scenario, the location slots can be filled in with the actual locations of the entities for the training objective and the geometrical conditions checked for satisfaction.

The challenge of scheduling the training objective instances is that many of them are dependent on each other. So, a brute force approach is to just try all combinations of values for each of potential time value. This is computationally difficult. To address the complexity associated with trying to complete the training objective templates, the PRESTO system converts the training objective conditions to temporal, spatial, spatiotemporal, resource and other kinds of mathematical or other computational constraints. These mathematical constraints can take a variety of forms, ranging from MSEL-like specific locations to very loose regional specifications to inter-training objective timing dependencies to weather and sea state requirements. For any one training objective for any one trainee, it is often the case that bringing about the required conditions (that is, satisfying the constraints) is easy even without automation, but it is also often the case that satisfying the constraints that represent the combination of training objective conditions for all trainees is extremely difficult. In fact, it is sometimes the case that there is no solution that satisfies all the constraints. In this case, what is needed is a solution that satisfies as many high-priority conditions as possible. When there is a solution, we have satisfied the constraints; when there is not, the solution is the optimal compromise.

Within PRESTO, each training objective condition is expressed formally, and all of them are fed to a mathematical CP application that satisfies or optimizes them. To complete the population of the training objective slots, the general way is to intelligently pick some of the values for the slots and then use those values to limit the choices for the values of the other slots (based on the defined conditions or constraints). PRESTO uses a number of approaches which pick certain slot values first and then optimize on other slot values.

Figure 8:
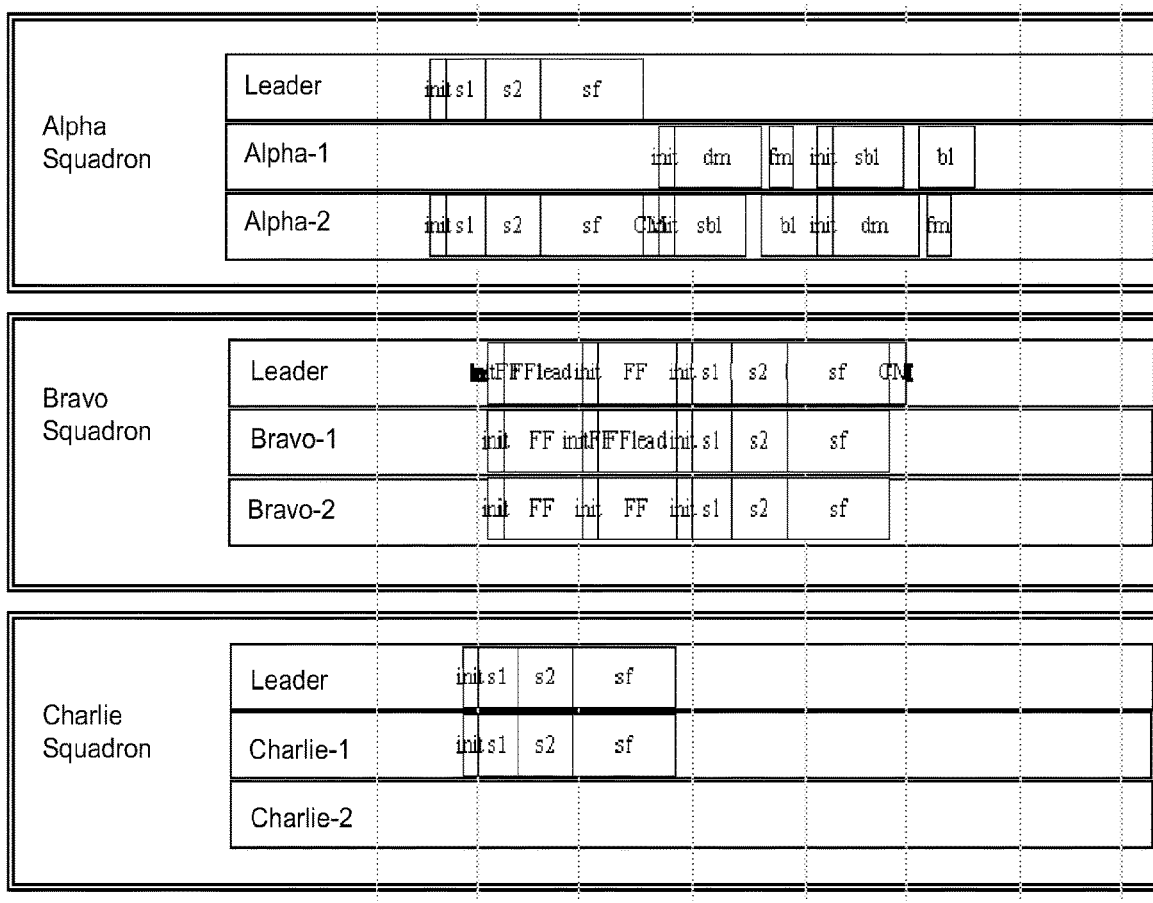
FIG. 8 illustrates one embodiment of a training scenario schedule.

One example of a suitable CP application into which these values are fed is the ECLiPSe Constraint Logic Programming environment. Another example is the COMET Constraint Programming environment. Both of these environments implement a type of constraint-based local search, in which an initial solution is found, and then a local search is performed for modifications that will be more optimal. A CP environment and the associated solvers also provide numerical and logical methods to approach the scheduling of activities in the scenario. This can be done both before the exercise begins in order to determine the best scenario plan, and it is done several times during the exercise in order to determine the best plan for the remaining time in the scenario, given training objectives actually achieved and the current state of the training exercise. The plan, also called a schedule or scenario, is expressed as a Gantt chart, which shows the planned sequence of activities for the scenario, displayed by trainee, instructor, or entity. FIG. 8 shows a sample schedule from the PRESTO Scheduling Tool.

Figure 9:
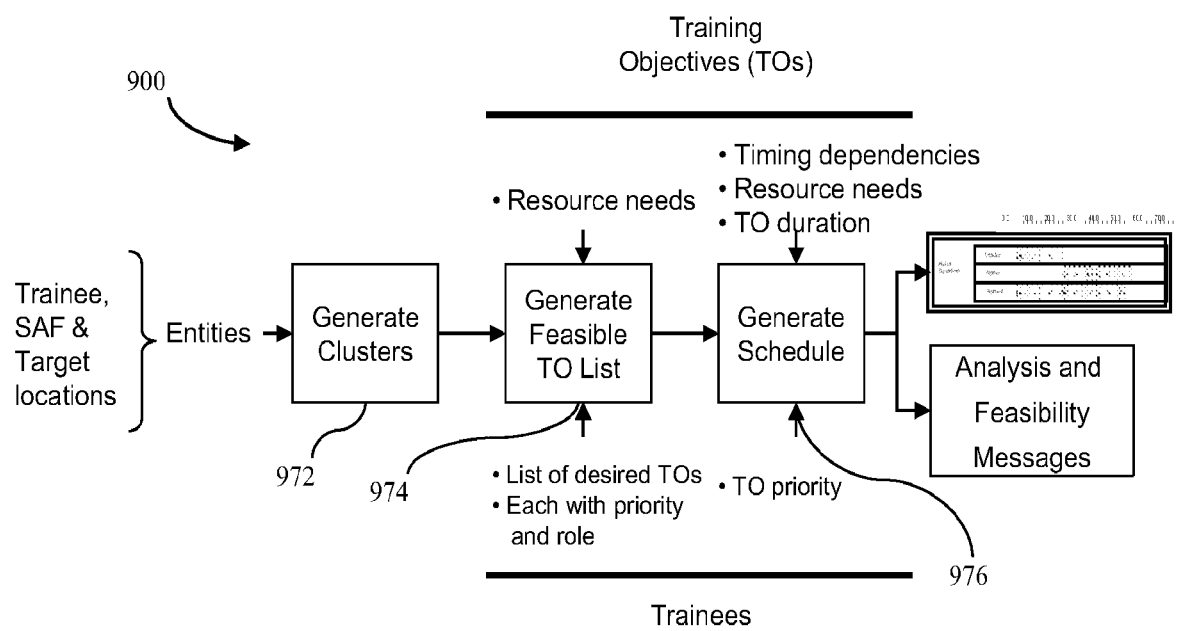
FIG. 9 illustrates one example of an analysis process.

Regarding scheduling, FIG. 9 shows one approach of scheduling activities. Specifically, this approach assigns entities to resource slots in a training objective template based on the constraint of their geographical location. Then the approach attempts to generate schedule times that satisfy the timing conditions. This approach has limitations in the situation when the entities have not been located yet (as in the scenario planning-time phase).

The schedule generation process shown in FIG. 9 has the following steps: generate clusters at step 972, generate feasible training objective list at step 974 and generate a schedule at step 976.

Step 972, generate clusters, takes an initial placement of all of the entities (trainees, SAFs and targets) and generates clusters of entities. These clusters are the groups of entities that will be used to satisfy training objectives. For example, consider a buddy lasing training objective. It would be most efficient to be able to buddy lase with another entity that is physically near and hence would be included in the cluster. The clustering process can be parameterized so that more or fewer clusters can be determined or clusters can be generated for larger regions. The clusters could also be aligned with organizational units. The results of this processing step are a set of clusters that contain a set of entities.

Step 974, generate feasible training objective list, analyzes each cluster to generate a list of feasible training objectives for the trainees in the cluster. First, a list of all of the training objectives for all of the trainees in the cluster is gathered. Then the resource requirements are checked to see if they can be satisfied. For example, if one trainee of the cluster has a fire missile training objective which requires a SAF target, but there are no targets in the cluster, then this training objective is not feasible (this problem can be mitigated by manipulating the targets to satisfy this requirement). The result of this step is a set of training objectives for each cluster that have feasible resource needs.

Step 976, generate schedule, generates a schedule for each cluster. The training objectives for the cluster are scheduled taking into account the following items. The source information for this step is generated by the PRESTO training objective authoring tool. Source information for this step can include timing dependencies, resource contention, priority and/or duration. Timing dependencies define training objective dependencies on time such as, for example, TO-1 must occur before TO-2, or TO-3 must happen concurrently with TO-4. Resource contention define resource constraints such as, for example, if two trainees need a target for a training objective and there is only one target available, then those two training objectives cannot be scheduled at the same time. Priority can define the priority of that training objective to that trainee. The scheduling optimization algorithm can favor the higher priority training objectives and schedule them earlier in the training exercise when possible. Duration can define the duration of the training objective and the duration of the training objective can be constrained to fit into the schedule.

The result of the scheduling process is a schedule of training objectives for each trainee and a list of analysis and feasibility messages. These messages describe conditions that could not be satisfied during the scheduling process. For example, trainee "A" cannot accomplish training objective "attack target" because not enough targets are available.

One Embodiment of Method to Monitor Training Scenarios:

As expected, during the actual execution of a scenario by a user, unexpected events can make it impossible to follow the original plan. For example, in a training exercise trainees may be busy learning new skills and may not be able to keep up with the planned pace of events. Also, equipment can fail, networks can malfunction, and simulators may not all have the same understanding of ground truth. As a result, there is a need to monitor progress against planned training objective conditions during the exercise, and to offer advice and suggestions to the instructors when things do not go according to plan.

Because the training objectives and preconditions have been defined as mathematical constraints, not only can they be used to schedule the objectives, but these constraints can be used in the monitoring of the execution of the user through a training scenario by populating the constraints with actual values of the users and their actions. This is particularly helpful if the training is conducted with the use of a software program because the monitoring may be integrated into the software training program.

Figure 10:
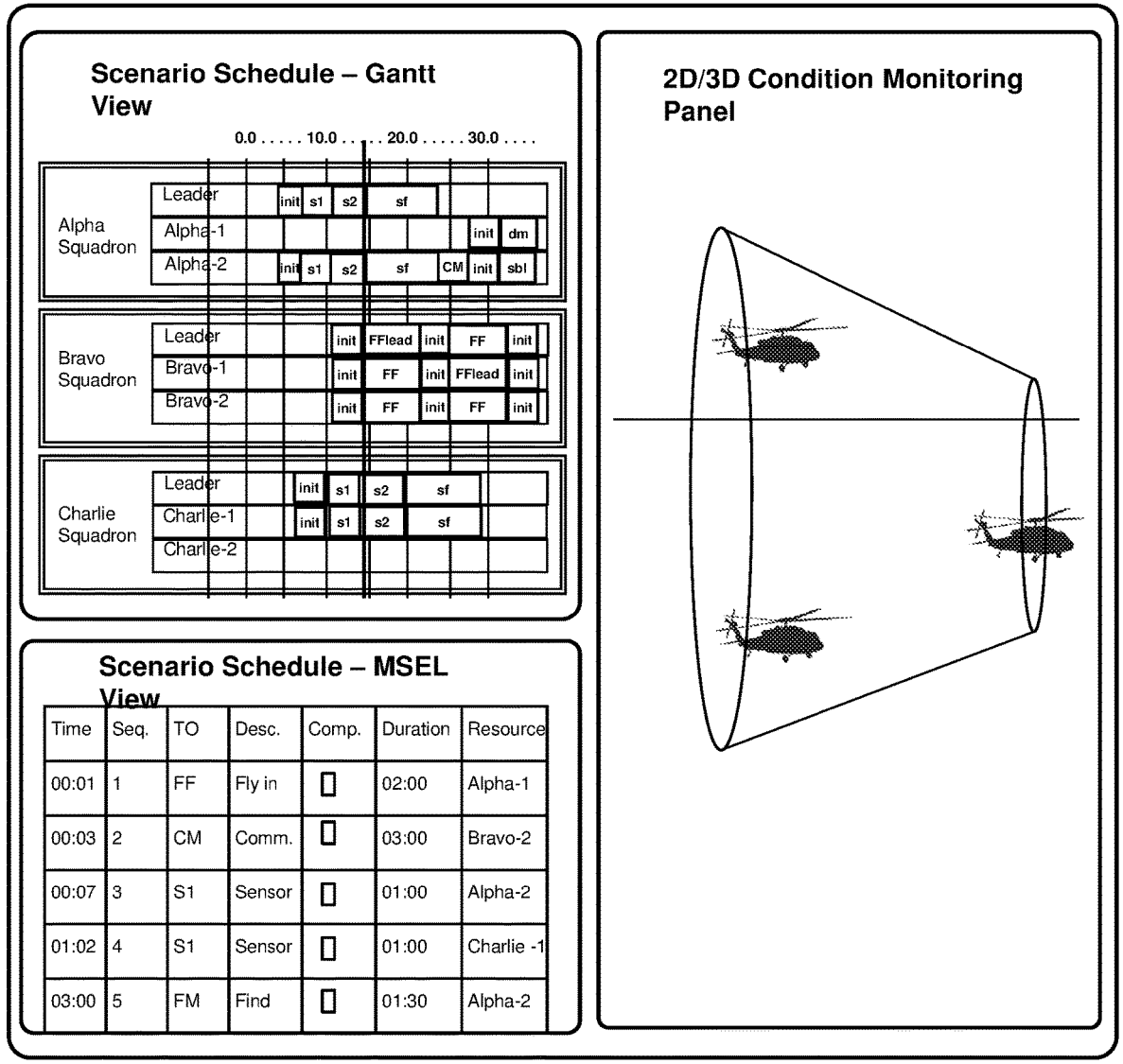
FIG. 10 illustrates a screen shot of one embodiment of a monitoring tool.

FIG. 10 shows an example of the PRESTO Monitoring Tool. By design, it aligns with the tools that capture training objectives and preconditions such as the PRESTO Capture Tool shown in FIG. 11. The monitoring tool can also identify conditions for emergent training objectives, that is, conditions that were not scheduled but that, should they occur, represent valuable teaching moments. When these occur, the instructor can be notified and is given an opportunity to take action that would be instructive for the trainees.

This example PRESTO embodiment also provides some custom 3D visualizations inside the 3D map view to depict training objective condition satisfaction monitoring. These are powered by the ground truth facts inside the CP processing engine. An external piece of logic is loaded (a 'visualization') that describes how the condition is to be visualized. For example, the WEZ (Weapon Engagement Zone) visualization uses a distance condition check that looks like: (1) receive updated information (if any) about entities in the world, (2) check range between the entities specified by the condition and (3) if within range, send a "RangeEvent" EventFact to be visualized.

This EventFact is a data element. It describes the entities involved, whether they were in or out of range, and the numeric values involved. However, it has no data that says how that EventFact should be visualized. To do that we create a "visualizer" that can visualize these EventFacts:

```
public interface IFactVisualizer
{
void visualizeEvent(EventFact f);
}
```

Figure 12:
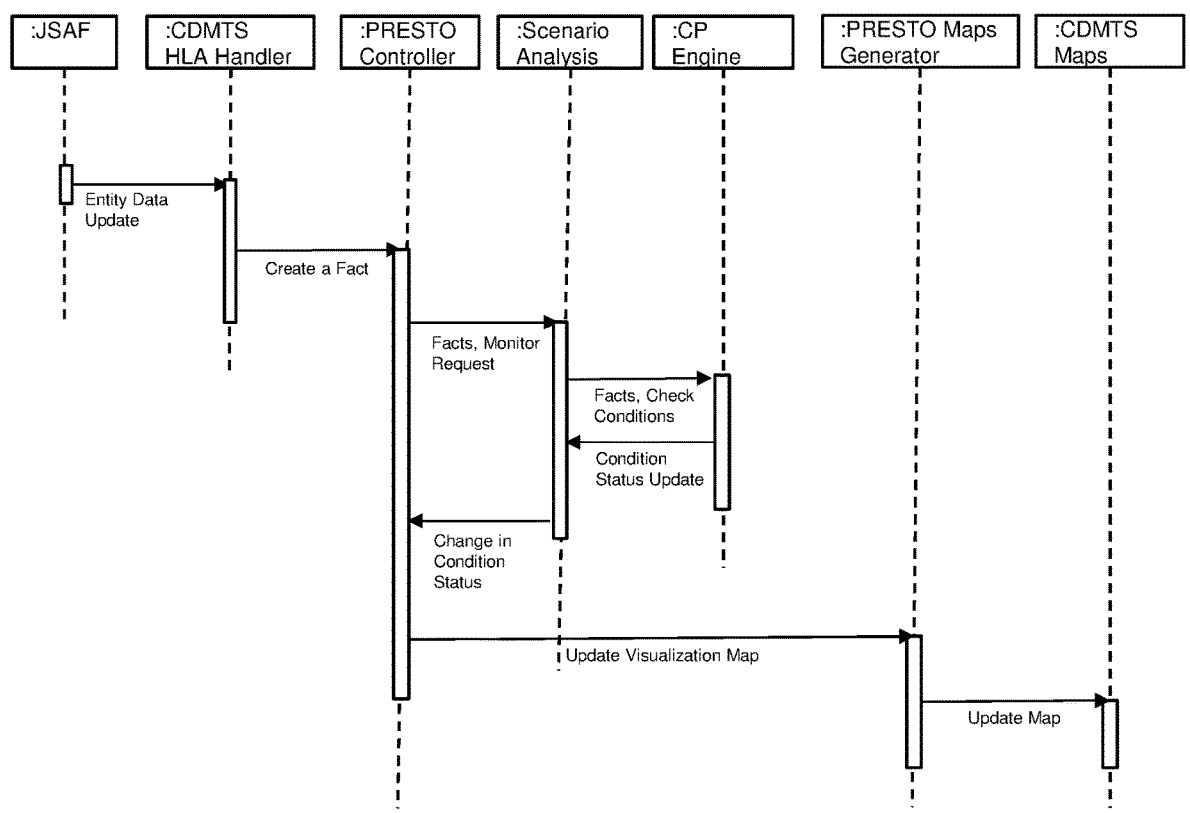
FIG. 12 illustrates an example of a sequence diagram of condition monitoring.

In this embodiment, the visualizer is connected to a 3D scene, but it need not be. It could be a 2D visualizer or it could write some data to a log file instead. This example visualizer interprets the RangeEvent and draws and colors a transparent 3D sphere at the appropriate distance between the two entities. Using this design it is easy to add new visualizations and even entirely new visualizers. FIG. 12 shows a sequence diagram showing the flow of data through the system that updates the visualization.

It is understood that although the above description can apply to training objectives and training scenarios, similar tools can be used to: monitor scenarios for conditions that recreate a lessons-learned scenario, monitor scenarios for conditions based on training objectives, monitor scenarios for conditions based on key computer game events and monitor scenarios for conditions based on story plot points.

Figure 11:
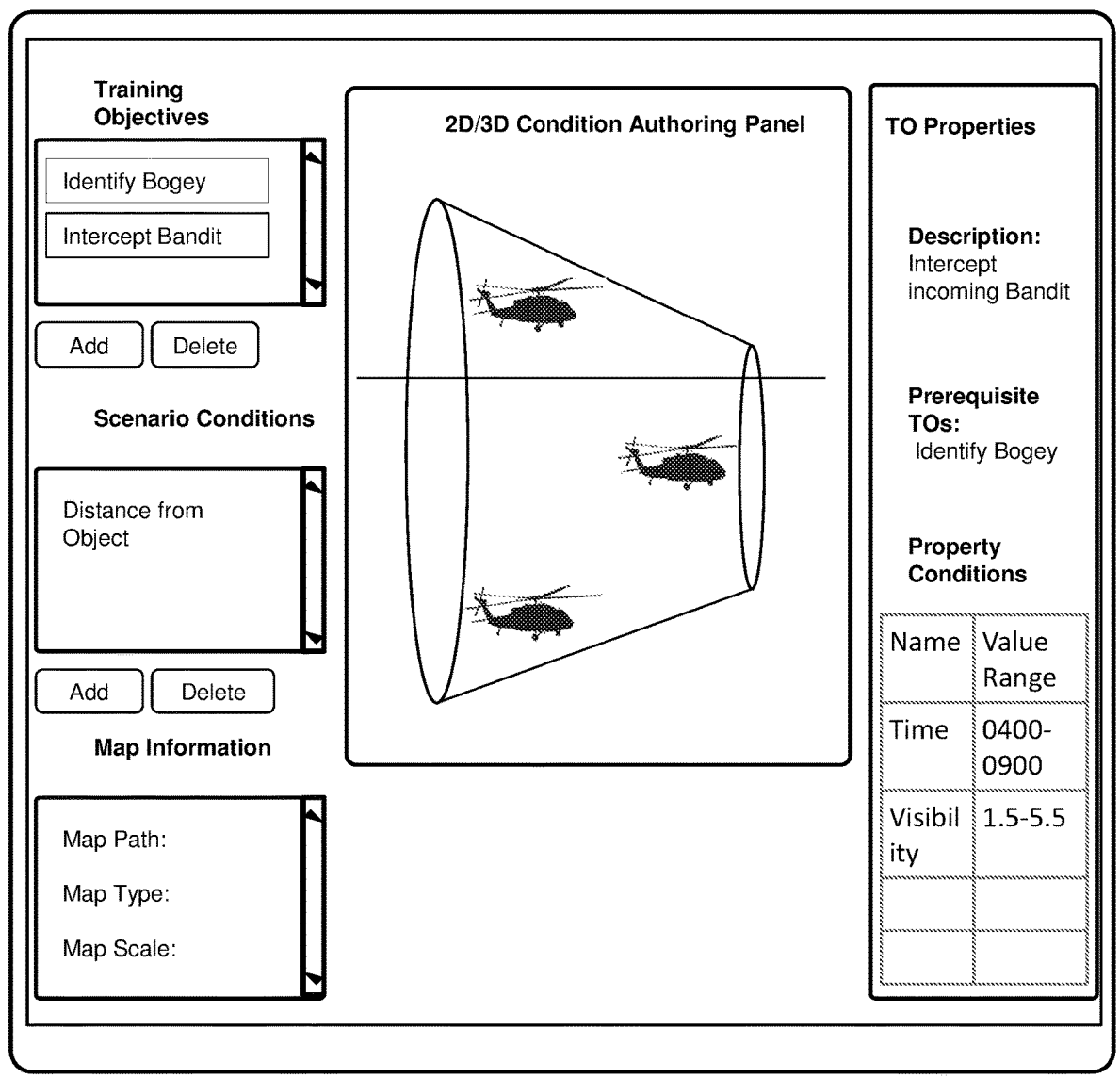
FIG. 11 illustrates a screen shot of one embodiment of a condition capture tool.

One Embodiment of Method to Capture the Conditions for Training Objectives:

The explicit capture of the conditions necessary for training objectives is a step not normally taken when planning training scenarios, though the training objectives do often play an implicit role. FIG. 11 shows an example screen from a Training Objective Capture Tool. Here, the range of the three-dimensional angle between two aircraft is being specified as a precondition. This application, in general, allows the specification of ranges of spatial, temporal, and other conditions (and combinations of these, like velocities), and it allows the specification of the scenario resources that will be required. It also allows instructors to specify the resources that will be available in the scenario, such as human-in-the-loop simulators, semi-automated forces, and the like.

It is understood that although the above description can apply to training objectives for training scenarios, similar tools can be used to: capture specific conditions to bring about during the scenario based on training objectives, capture specific conditions to bring about during the scenario based on key computer game events, capture specific conditions to bring about during the scenario based on story plot points and capture specific conditions to bring about to recreate a lessons-learned scenario.

Other Application Areas:

The scenario defining and monitoring system such as PRESTO can be applied in a variety of areas. For example, scenarios for computer games can be structured this way, providing interactive freedom for the players—but instead of training objective conditions, the tools would specify key gaming events. Similarly, interactive fiction can benefit from this approach. Authors could specify conditions for key plot points, and let the players as well as the automated characters do whatever they want as long as they meet the conditions of the key plot points. This would considerably reduce the need for plot branching, with a concomitant increase in the potential for plot complexity.

It is also understood that the systems and methods described can be used by specifically programmed computer based learning systems where the training objectives or conditions may be a learning task or event within a broad educational subject area.

One Embodiment of a Scenario Defining System:

The various method embodiments of the invention will be generally implemented by a computer executing a sequence of program instructions for carrying out the steps of the methods, assuming all required data for processing is accessible to the computer, which sequence of program instructions may be embodied in a computer program product comprising media storing the program instructions. A computer-based system by which the methods of the present invention may be carried out include a computer system having a processing unit, which houses a processor, memory and other systems components that implement a general purpose processing system or computer that may execute a computer program product comprising media, for example a compact storage medium such as a compact disc, which may be read by processing unit through disc drive, or any means known to the skilled artisan for providing the computer program product to the general purpose processing system for execution thereby.

The program product may also be stored on hard disk drives within processing unit or may be located on a remote system such as a server, coupled to processing unit, via a network interface, such as an Ethernet interface. A monitor, mouse and keyboard are coupled to processing unit, to provide user interaction. A scanner and printer are provided for document input and output. The printer can be coupled to processing unit via a network connection, but may also be coupled directly to the processing unit. The scanner can be coupled directly to the processing unit directly, but it should be understood that peripherals may be network coupled or direct coupled without affecting the ability of workstation computer to perform the method of the invention.

As will be readily apparent to those skilled in the art, the present invention can be realized in hardware, software, or a combination of hardware and software. Any kind of computer/server system(s), or other apparatus adapted for carrying out the methods described herein, is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

One embodiment of a computer system that can be used for the operations described in association with any of the methods described herein includes a processor, a memory, a storage device, and an input/output device. Each of the components are interconnected using a system bus. The processor is capable of receiving information and processing instructions for execution within the system. The processor is capable of processing instructions stored in the memory or on the storage device to display information for a user interface on the input/output device. The memory provides a means to store information within the system. In some implementations, the memory is a computer-readable storage medium. In one implementation, the memory is a volatile memory unit. In another implementation, the memory is a non-volatile memory unit. The storage device is capable of providing mass storage for the system. In some implementation, the storage device is a computer-readable storage medium. In various different implementations, the storage device may be a floppy disk device, a hard disk device, an optical disk device, or a tape device. The input/output device provides a means to receive information and means for input/output operations for the system, such as receiving data and may be in communication with a user interface. In one implementation, the input/output device includes a keyboard and/or pointing device. In another implementation, the input/output device includes a display unit for displaying graphical user interfaces.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: conversion to another language, code or notation; and/or reproduction in a different material form.

For illustration purposes and not for limitation, one embodiment of the program instructions to implement the methods of this invention is described below.

Figure 19:
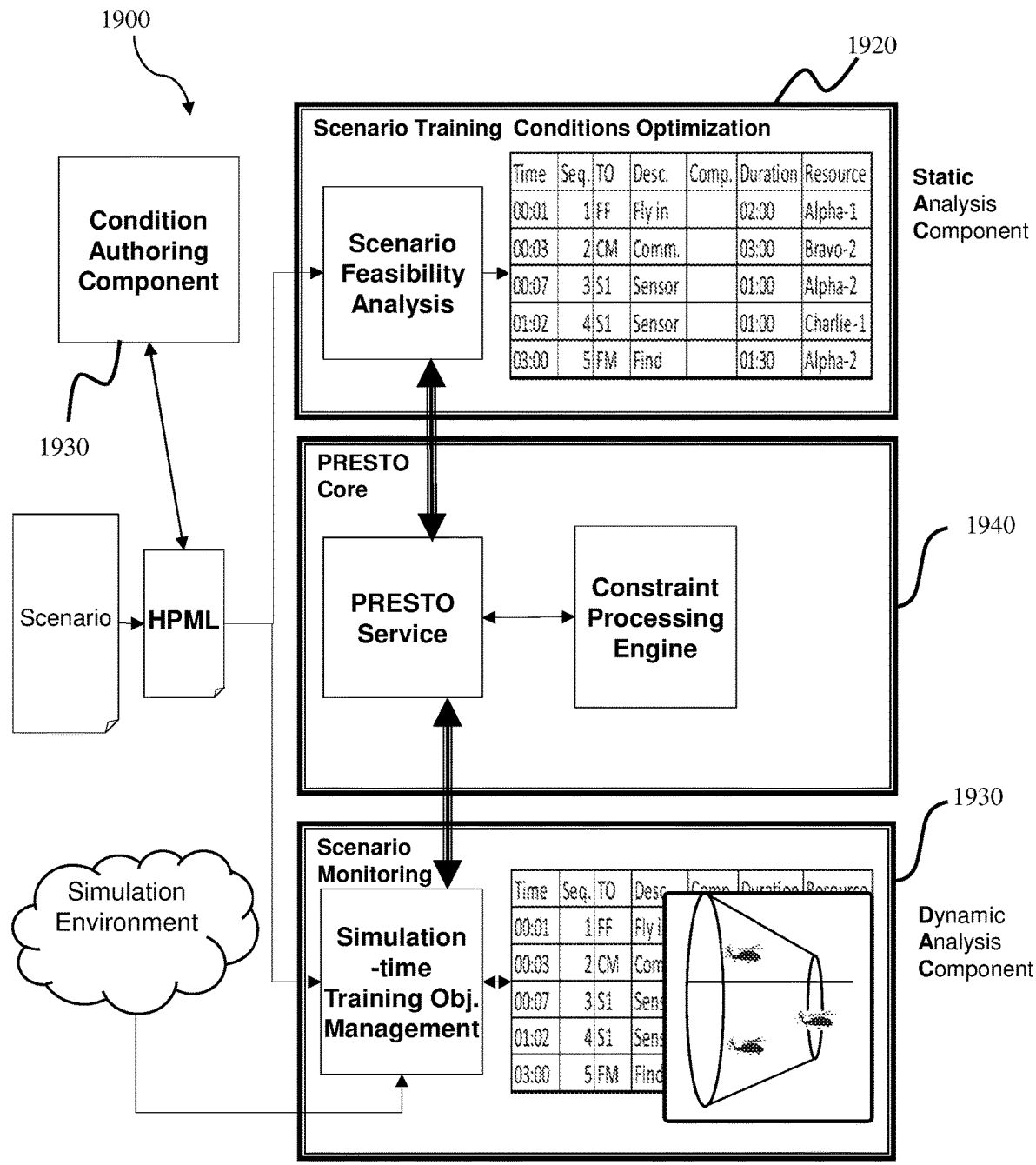
FIG. 19 illustrates a functional diagram of one embodiment of Use Cases of a scenario defining system.

FIG. 19 shows the high level structural view of a PRESTO system as one embodiment. At the top level, PRESTO has four major components. These components are: Condition Authoring Component—used to define training objectives and other information PRESTO needs to function; Static Analysis Component—used during training planning and scenario design to support instructors and scenario designers; PRESTO Core—core functions of PRESTO that are shared between static and dynamic components of PRESTO; and Dynamic Analysis Component—used during training exercises to support instructors and SAF operators to increase training opportunities The top part of FIG. 19, 1920, shows PRESTO supporting the static analysis of a scenario of conditions. In static analysis, or training planning-time use, the scenarios are either existing scenarios or PRESTO enhanced scenarios which are in the planning or implementation stage or have been modified. PRESTO is used to plan and analyze the scenario to determine if it is feasible. PRESTO does this by verifying that fundamental conditions in the scenario meet the required conditions. For example, a single helicopter could not participate in two different training objectives at the same time, or be in two different locations at the same time. Other factors such as weather and time of day could also be considered in the feasibility determination. The results of the scenario feasibility analysis would provide information to the scenario designer so they could correct any issues before the scenario goes to the simulation environment for actual training.

The lower part of FIG. 19, 1930, shows the use of PRESTO in a dynamic situation or training run-time use situation. In this case PRESTO is used by instructors and SAF (semi-automated forces) operators to analyze real-time data from a simulation environment and advise them on either planning additional training objectives or satisfying conditions for training objectives to be worked on. Here the analysis is done based on actual conditions in the training exercise and PRESTO responds to the behaviors of the entities in the simulation environment. For example, if a trainee has a training objective of deploying a missile using buddy lasing, PRESTO can monitor the conditions in the simulation environment to verify they are correct for the buddy lasing missile deployment. The results of the dynamic analysis will be various visualizations hosted by the other systems used by SAF operators and instructors.

The center box in FIG. 19, 1940, shows the PRESTO Core. This includes the means to receive HPML which provides pedagogical information about the scenario and the constraints that describe the pre-conditions needed for the training objectives. The PRESTO Service is the core capability of PRESTO which is used in both the static and dynamic use cases. One component of the PRESTO Core will be the Constraint Processing Engine. This is the part of PRESTO that will be able to take in a set of values about the entities in the scenario either static or dynamic (such as location, speed) from the simulation or from the scenario definition and determine if they satisfy the constraints defined for the training objectives.

In one embodiment, the PRESTO Core comprises three components: the PRESTO Controller; the Scenario Analysis and ECLiPSe. The PRESTO Controller manages the workings of PRESTO. Its main function is to receive requests from other components, to process them and to send the results to the visualization components. The Scenario Analysis component does the various scenario analysis functions of PRESTO. This includes checking a scenario for feasibility, monitoring training objective condition satisfaction and searching for emergent training objectives. The ECLiPSe component is the constraint programming environment which solves the constraint problems generated by PRESTO.

The next set of architecture diagrams are Uniform Modeling Language (UML) component diagrams that show the structure of both the scenario training planning-time use of PRESTO and the training run-time use of PRESTO.

Figure 21:
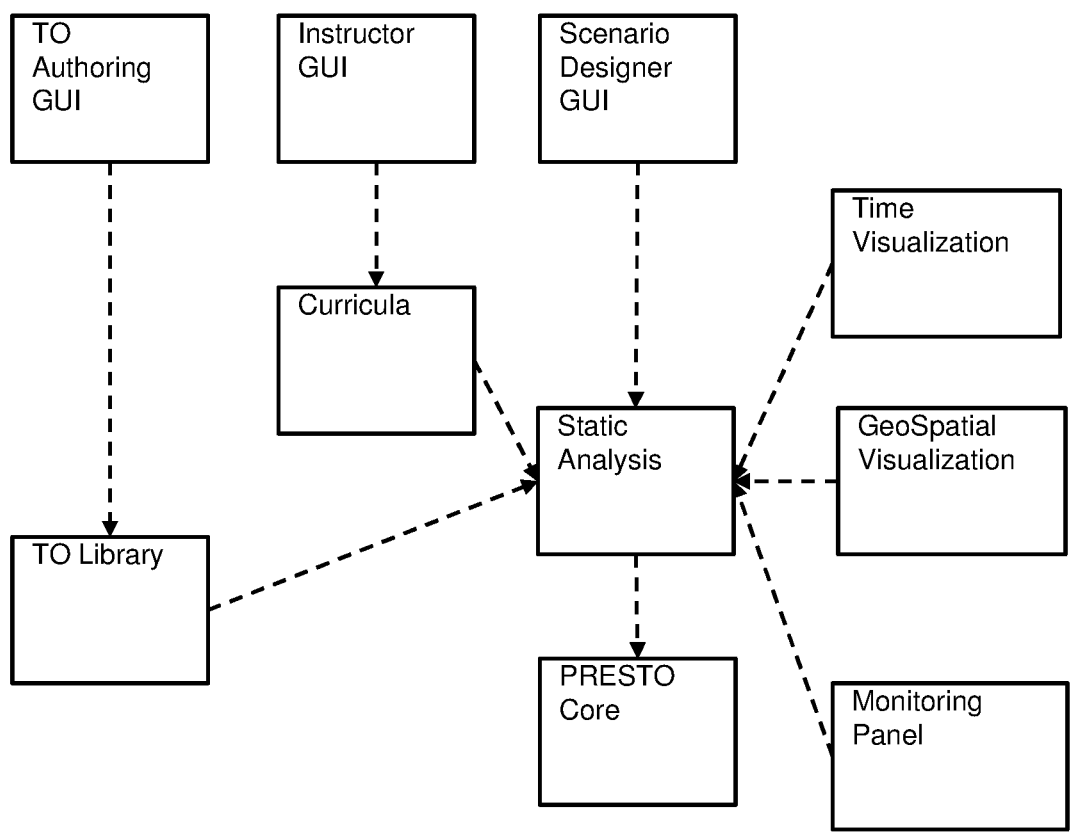
FIG. 21 illustrates a component diagram of one embodiment of a scenario defining system.

FIG. 21 shows a component diagram for the scenario planning-time use of PRESTO. This diagram shows the high level packages of components that make up the PRESTO system. During scenario planning-time use, PRESTO has the following major packages of functionality: Training Objective Authoring GUI—this is the graphical user interface (GUI) that provides one means to provide information to define training objectives and their conditions (such as resources and timing conditions); Training Objective Library—this is the repository of defined training objectives that can be re-used in multiple training scenarios (HPML is used to transfer training objective data to and from this repository); Instructor GUI—this component is used by the training instructor to specify the set of training objectives for each trainee (the training objectives for each trainee also have priorities associated with them); Curricula—this component is a repository for the lists of training objectives that have been assigned to trainees; Scenario Designer GUI—this graphical user interface is used by the scenario designer to run feasibility analysis of the scenario, to view the visualizations and to make changes to the scenario training data to fix problems; Scenario Analysis—this component receives information and provides the scenario analysis functions of PRESTO such as determining feasibility of a scenario and optimizing training objectives; Time Visualization—this component provides a visualization of the time aspects of the scenario (this component will generate a GANTT-like chart of the schedule of training objectives for each trainee); Geo/Spatial Visualization—this component will show geometric and spatial conditions of the training objective in the context of the scenario being designed; and Monitoring Panel—this component will show messages to the user (for example, when checking the feasibility of a scenario, PRESTO might determine that there are not enough resources to satisfy the conditions for a buddy lase training objective and one of the ways the user will be informed of this is via the monitoring panel).

Figure 22:
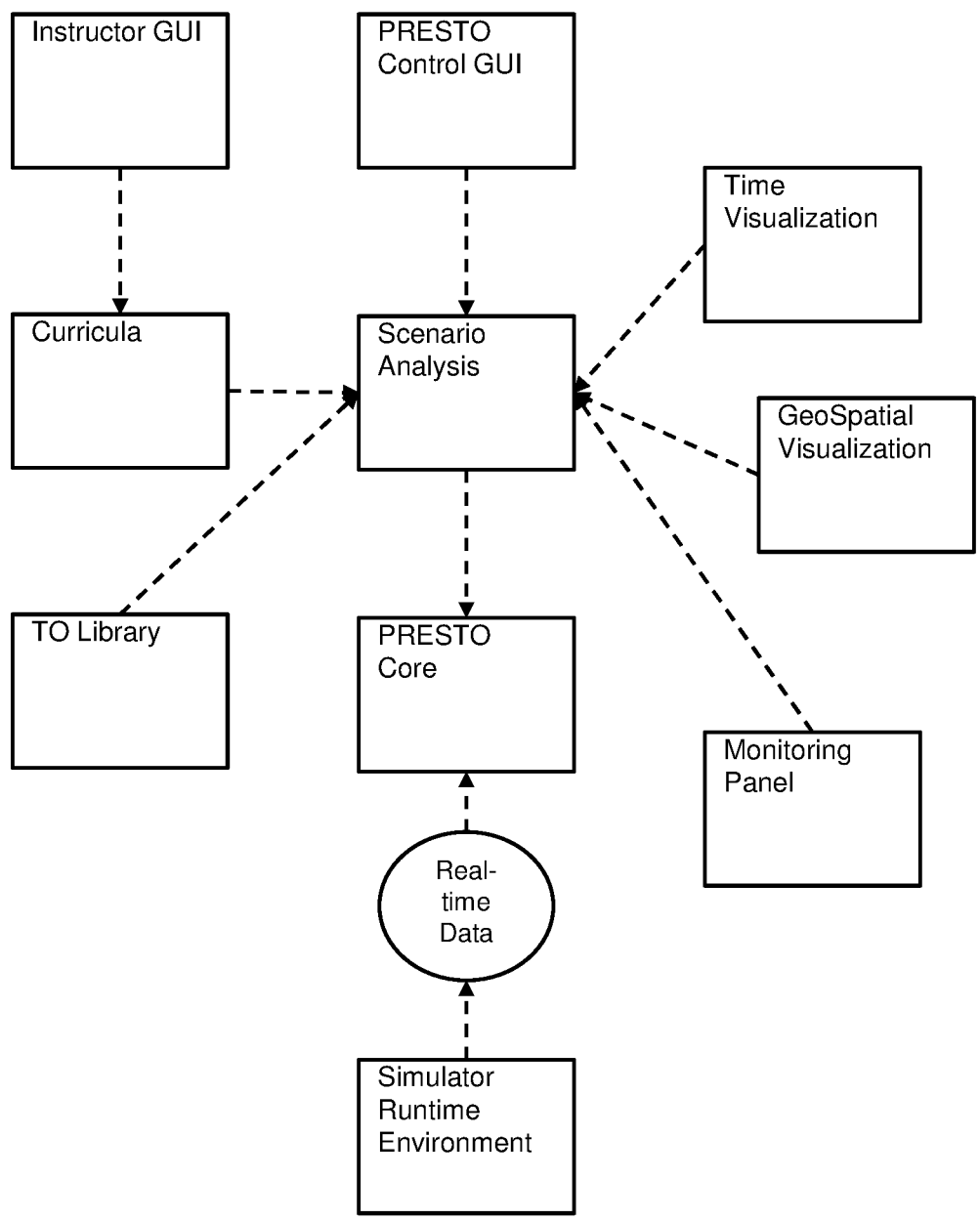
FIG. 22 illustrates a component diagram of one embodiment of a scenario monitoring system.

FIG. 22 shows a component diagram of the PRESTO system as configured during training run-time use. The PRESTO system shares a number of components between scenario planning-time and training run-time. The additional components and the different features of the components of FIG. 21are described here: Instructor GUI—through this component the instructor can monitor the runtime environment and visualizations and can add or change the training objectives for a trainee based on current conditions; PRESTO Control GUI—this component would be used by either the instructor or the SAF operator to invoke various functions of PRESTO such as to do scenario re-scheduling or visualizations; Simulator Runtime Environment—during training run-time, this component receives real-time data from the simulation environment and passes it to the PRESTO Core (the PRESTO Core uses this information to do real-time monitoring of conditions and to generate visualizations).

One capability of some embodiments of the PRESTO system has to do with the size of the 3D world that can be used with the system. One set of suitable topographical data is ETOPO which comes from NOAA (National Oceanographic and Atmospheric Administration). ETOPO2 provides 58,320,000 individual elevation values. At first this does not seem very large until we start attaching some data to each elevation point, say for example, a modest 1-32 bit elevation value (4 bytes) and 1-32 color value (4 bytes). With just this modest amount of additional data, we multiply our base value (58 million) by 8 and divide by a megabyte (1,048,576 bytes) to get a base memory value of 445 megabytes. This could be a significant drain on memory resources, just dedicated to terrain data. A data set with twice the resolution, ETOPO1 (21600 by 10800) provides 233,280,000 elevation points and results in a memory allocation of 1.7 gigabytes. This can cause a problem when scaling the system. One approach to managing this data is to take advantage of the fact that the user is only viewing a small part of the world at any given time. To handle this, we broke the monolithic terrain mesh up into terrain pages. Pages are loaded dynamically as they come into view, so we are only using memory and processing time to handle the pages that we are using at the time. This greatly reduces the memory requirement of the 3D terrain data part of PRESTO. Further optimization is contemplated where the user selects a given part of the world where a scenario is taking place and smaller sub-grids would be loaded instead of the whole world.

An Operational Example of One Embodiment of the Methods:

In operation, the methods to define training scenarios disclosed generally comprise the steps of defining at least one condition for at least one training objective where the condition is represented by at least one constraint and scheduling the conditions into a training scenario. In a preferred embodiment, multiple objectives, multiple conditions and multiple constraints are used to define or monitor the scenario.

Figure 13:
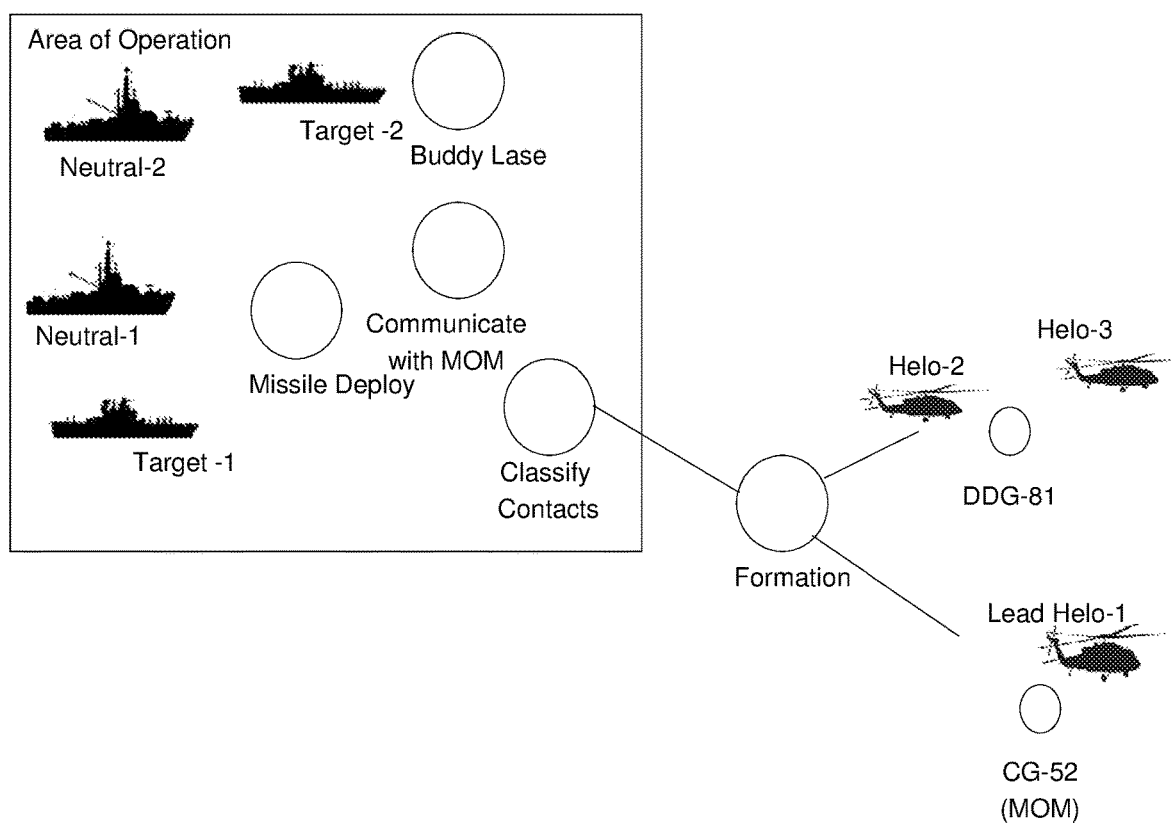
FIG. 13 illustrates an example use case scenario.

Described below is one embodiment of a detailed scenario to provide data for the PRESTO system described above. FIG. 13 shows the example scenario having the following sequence of activities: (1) three MH-60R helicopters (helos) take off from ships: (2) they rendezvous at a given location and fly in formation towards an area of operation; (3) once in the area of operation, the MH-60R helos use two on-board sensors to classify contacts in the area of operation; (4) the lead helo communicates with MOM; and (5) two helos do a buddy lase and deploy missile training activity.

The example scenario replicates the basic scenario described here three times for a total of nine MH-60R helos. The scenario consists of several entities in a virtual world that has both land and sea components. The scenario can present opportunities for training training objectives, each having conditions that generally describe attributes of the entities and components (location, altitude, state of their radar), relationships among the entities (spacing, relative velocities), or other aspects of the world (a high sea state, cloudy weather). The entities are considered resources for the training objectives whenever one or more is a required part of the associated conditions. The entities themselves can satisfy conditions of the training objective or they can provide resources or values to populate slots/unknowns of constraints. For example, other helos for a trainee to fly in formation with are considered resources for the fly-in-formation training objective. Multiple training objectives may in some cases require overlapping multiple resources, though in other cases a resource must be dedicated to a single training objective at a time. Table 1 shows the entities contained in the example scenario.

TABLE 1

Example Scenario Entities

| Entity Type | Entities |
|---|---|
| MH-60R | Three sets of three helicopters. These can represent either trainees or SAFs |
| Targets | Target ships for sensor, lasing and missile training objectives |
| Neutrals | Neutral ships for clutter |

Table 2 shows the example training objectives within this scenario. Each training objective has constraints such as resource conditions and timing conditions. For example, the "Fly in 3 ship formation" training objective requires a total of 3 helos. The group of 3 helos that can participate in that training objective must have one helo in the lead role and 2 other helos (not in the lead role).

TABLE 2

Example Training Objectives in Scenario

| Training Objective | Code | Resource Conditions | Timing Conditions |
|---|---|---|---|
| Fly in 3 ship formation | ff | 1 lead helo and 2 other helos | None |
| Sensor 1 | S1 | At least one target | None |
| Sensor 2 | S2 | At least one target | None |
| Classify contacts | cc | None | After Sensor 1 and Sensor 2 |
| Communicate with MOM | cm | None | After Classify contacts |
| Buddy lase | bl | At least one target, a helo to deploy the missile | After Communicate with MOM |
| Deploy missile | dm | At least one target, a helo to lase the target | Concurrent with Buddy lase, after Buddy lase begin, and before Buddy lase end. |

Training objective timing conditions specify any scheduling constraints that exist between training objectives. For example the scheduling of the Deploy missile training objective must happen after the start of the Buddy lase training objective. The Buddy lase training objective must continue until after the Deploy mission training objective is complete.

To further provide values for the example use case scenario, training personnel indicate the training objectives for each trainee. These trainee training objectives identify some conditions to be used for this trainee which can be put into a scenario. When multiple trainees are involved, these conditions are combined for a set of scenario training objectives. Table 3 shows the list of training objectives that was assigned to each of the nine trainees in this example. Each training objective assigned to a trainee can be given a priority and a role. This data was used to analyze and generate a schedule for the scenario.

TABLE 3

Example Scenario, Trainee Training Objectives

| Helo | Trainee ID | Training Objective | Priority |
|---|---|---|---|
| aS1-1 | Helo1 | ff-lead | 1 |
|  |  | ff-other | 5 |
|  |  | s1 | 2 |
|  |  | s2 | 1 |
|  |  | sf | 1 |
|  |  | cc | 1 |
|  |  | cm | 1 |
|  |  | bl | 1 |
|  |  | dm | 1 |
|  |  | fh | 1 |
| aS1-2 | Helo2 | ff-lead | 3 |
|  |  | Ff | 1 |
|  |  | s1 | 3 |
|  |  | s2 | 3 |
|  |  | sf | 2 |
|  |  | cc | 5 |

TABLE 3-continued

Example Scenario, Trainee Training Objectives

| Helo | Trainee ID | Training Objective | Priority |
|---|---|---|---|
| aS1-3 | Helo3 | ff-other | 3 |
| | | s1 | 5 |
| | | s2 | 5 |
| | | sf | 5 |
| | | cc | 5 |
| aS2-1 | Helo4 | ff-lead | 2 |
| | | s1 | 2 |
| | | s2 | 2 |
| | | sf | 2 |
| | | cc | 2 |
| aS2-2 | Helo5 | ff-lead | 2 |
| | | bl | 5 |
| | | dm | 5 |
| | | fh | 5 |
| aS2-3 | Helo6 | s1 | 1 |
| | | s2 | 3 |
| | | sf | 7 |
| | | cc | 5 |
| | | cm | 2 |
| | | bl | 1 |
| | | dm | 8 |
| | | fh | 8 |
| aS3-1 | Helo7 | ff-other | 1 |
| | | s1 | 1 |
| aS3-2 | Helo8 | s1 | 5 |
| | | s2 | 5 |
| | | sf | 5 |
| | | cc | 5 |
| aS3-3 | Helo9 | s1 | 8 |
| | | s2 | 8 |
| | | sf | 8 |
| | | cc | 8 |

For each of the training objectives (e.g. ff=Fly in 3 Ship Formation from Table 2), the conditions are defined by constraints which are then represented mathematically. The conditions and constraints of this embodiment follow the training objective template of FIG. 7. An example of this is shown below.

TABLE 4

Example of Training Objective (TO) Conditions, Constraints and Mathematical Representation for Training Objective Fly in 3 Ship Formation

| Condition Type | Constraint | Mathematical Representation for Fly in 3 Ship Formation |
|---|---|---|
| Geo/spatial Conditions | Distance between TO entities | Distance (Lead-Helo, Helo-2) < D, Distance(Lead-Helo, Helo 3) < D, |
| Context Conditions | Weather conditions | 2 < Wind Speed < 15 |
| Resource Conditions | Resource Types | 1—Lead role Helo, 2—Other role Helos |
| Timing Conditions | Must follow | Must follow Rendezvous TO |

To complete this scenario training objective, which is combined with other training objectives to create a scenario, other constraints and representations of the conditions must be identified, such as training objective slots in this case. These training objective slots represent variables that will be given values during planning-time or run-time use. The training objective slots in this embodiment are:

TABLE 5

Example of Identifying Values for Conditions with Slots

| Condition Type | Constraint | Mathematical Representation |
|---|---|---|
| Resource Slots | Lead Role, Other Role 1, Other Role 2 | Helo1, Helo7, Helo3 |
| Geo/spatial Slots | Location of Lead Role, Location of Other Role 1, Location of Other Role 2 | $X_1, Y_1, Z_1$, $X_2, Y_2, Z_2$, $X_3, Y_3, Z_3$ |
| Timing Slots | Start time, End time | $T_1$, $T_2$ |

The variables in the mathematical representations in Tables 4 and 5 are given values by entities, resources, and other information provided either from humans (e.g. instructors) making decisions about which trainees will be addressing which training objectives during the scenario, by other available information about the scenario and scenario plan, such as the availability of virtual simulators or constructively simulated entities in a given simulated region or automatically through a data source such as HPML. In some cases, both human input and computations by the constraint programming system provide values for the entity, resource, and other slots. For example, when instructors decide that a certain trainee needs to address the fly-in-formation training objective (for example, in the Lead Role), the constraint programming environment will identify feasible other helos to fill in the other entity slots for that training objective (for example, in the Other Role 1 and Other Role 2). Although not a part of the embodiment described here, it is certainly possible that future embodiments will defer the filling of all slots until after they have been scheduled. This would allow instructors to decide, for example, to schedule two groups of three trainees for the fly-in-formation training objective while deferring until later who those trainees will be and which entities they will be flying in the scenario.

Similarly, the above process of mathematically representing the conditions and constraints for the "Fly in 3 Ship Formation" training objective can be done for the other training objectives such as the "Sensor 1" training objective of Table 2.

With the mathematical representation of the above constraints the scenario can then be modeled and an optimal solution can be found with constraint programming and/or constraint based local search. Many kinds of constraint based local search could be effective, depending on the specific problem—tabu search, variable neighborhood search, and simulated annealing, for example. In the present embodiment, the scheduler used a version of finite horizon scheduling, useful in a rapidly-evolving environment because it doesn't attempt to schedule the entire scenario at once, coupled with simulated annealing once a feasible solution has been found.

The constraint programming engine then assembles a constraint for the objective function (typically using the priorities on the objective function, but other objective functions may be specified by the user) and solves the resulting problem optimally.

In the embodiment described here, constraint-based scheduling is accomplished by decomposition: a main model takes care of assigning the resources to the different training objectives, whereas the sub-model (a.k.a. slave problem) tries to find the best schedule considering the given assignment while satisfying temporal, spatial, and resource constraints. FIG. 20 shows an embodiment of this decomposition process 2000 graphically: the assignment model 2041 feeds possible assignments to the scheduling model 2043. The scheduling model attempts to improve on its initial solution. If it finds one at 2045, this is the "New Bound" branch 2048 in the diagram. If it does not find an initial solution at 2045, it asks the assignment model for a new set of assignments at 2046. Several assignments are provided to the sub-problem to quickly explore a fairly large yet promising portion of the search space. To avoid unnecessary work, the embodiment forces the slave problem to find solutions with a better objective value with respect to the incumbent solution, i.e., the best solution found so far. The best solution found at 2047 is used to define the solution 2049.

In the constraint programming engine, a structure for shared data stores the data structures that are useful for both the assignment and the scheduling model. In particular, it maintains two maps (both are bijections)—from trainer IDs to integer (and vice versa) and from trainee IDs to integer (and vice versa). The integers are used in the constraint programming variables whereas the IDs are used for presentation purposes and to retrieve the relevant data used for scheduling. The shared data structure also precomputes the distances between all the entities (the distance matrix) for the assignment model. Last but not least, starting from the set of training objectives, it creates the set of all training objective constraints in a form useful to the constraint programming environment.

A software object describing the assignments of resources to training objectives, the assignment model, is used by the constraint programming model. Each training objective has an associated structure describing the constraints that define the resources needed. For each resource request, the model associates a decision variable whose domain ranges exactly over all the possible alternative resources in the resource request. At this point, the constraint programming model does not present any other constraints in the current solution, but rather uses the assignments to continue the search.

The software object describing the assignments has a method that implements a search heuristic that greedily tries to assign a trainee to a training objective resource request based on its average proximity to the initial positions of the trainees involved in the training objective. Each solution to this model is presented to the slave problem described next. The search may be bounded by a time limit, by a maximum number of fails or by a maximum number of solutions found. In tests, the heuristic performed quite well, giving good assignments of resources to the resource slots in the training objectives early on in the search.

The scheduling model is an object that fixes events in time while satisfying temporal, resource, and spatial constraints, to finally produce a schedule for the trainees. It starts by creating the set of unary resources to represent the trainees. Then it creates a resource (either unary or discrete) for each other resource involved in the scheduling model. Next it creates for each trainee a set of events that represents the tasks to be performed by the trainee. Finally, it defines for each trainee the transition times for every activity pair: these transition times represent the space constraints, i.e., the time spent to fly from one location to another. The scheduling object has a method that implements the search strategy that ranks the trainee resources and sets the times of the events.

In the constraint programming engine, the object describing the constraints associated with a training objective is responsible for three tasks. First, it defines the resource requirements for the specific training objective. In particular, it retrieves the set of resources instances whose descriptions correspond to the required ones. The set of preselected resources in the assignment object is used as a starting place. Second, it creates the set of events that comprises the training objective. Note that a single training objective possibly involves several events and may employ more than one trainee. And thirdly, it posts the resource constraints and their associated temporal constraints for the resources needed by the training objective. The resources are considered loaded during the whole duration of the training objective; therefore constraints associated with a training objective have a lifetime that spans its whole duration.

The result of this modeling is a schedule of activities for each trainee and each resource (entity) during the scenario. An example of schedule, or scenario, is shown in FIG. 8. Because the constraints that were solved to come up with the schedule were in general ranges of locations, times, and so on, it will be rare that the schedule indicates exact places and times for events. Instead, it will indicate ranges of times, locations, and often other decision variables. These can be presented to the instructor as a Gantt chart that indicates earliest and latest start times for each event.

It should be noted that in some embodiments, a scenario planning-time result can be obtained without having to identify specific entities or resources.

During actual training time, when the scenario is being executed, the schedule is monitored to identify for the instructor which "event windows" in the schedule are now open. When the constraints on that event window are partially but not fully satisfied—typically because the timing is acceptable but spatial relationships or other conditions are not—the user has access to understanding the constraints that must be met in order for the trainee to address the intended training objective.

The system can also notify the instructor when the opportunity to address a training objective has passed—that is, when the current time in the simulation is later than the latest time in the Gantt chart. When this has happened enough times (or at any other time the instructor chooses), the instructor may request that the constraint programming environment reschedule the remaining training objectives. In doing so, it uses a process identical to the one described above except that it uses the remaining unaddressed set of training objectives and their constraints, the current set of resources and their locations, and any other relevant current data as a starting place.

Example Use Cases:

The use cases contained in this section show the users of the PRESTO system and the primary functions they can accomplish using one embodiment of PRESTO. The following users of PRESTO have been identified: (1) Training Objective Author who defines training objectives and the training objective pre-conditions, (2) Scenario Designer who creates training scenarios and analyzes them to increase training opportunities, (3) Trainer who identifies the training objectives that trainees should work on both pre-training and during the training exercise and (4) SAF Operator who monitors training activities during the training exercise. PRESTO provides them with information so they can promote the satisfaction of training objective pre-conditions to increase training opportunities.

Figure 14:
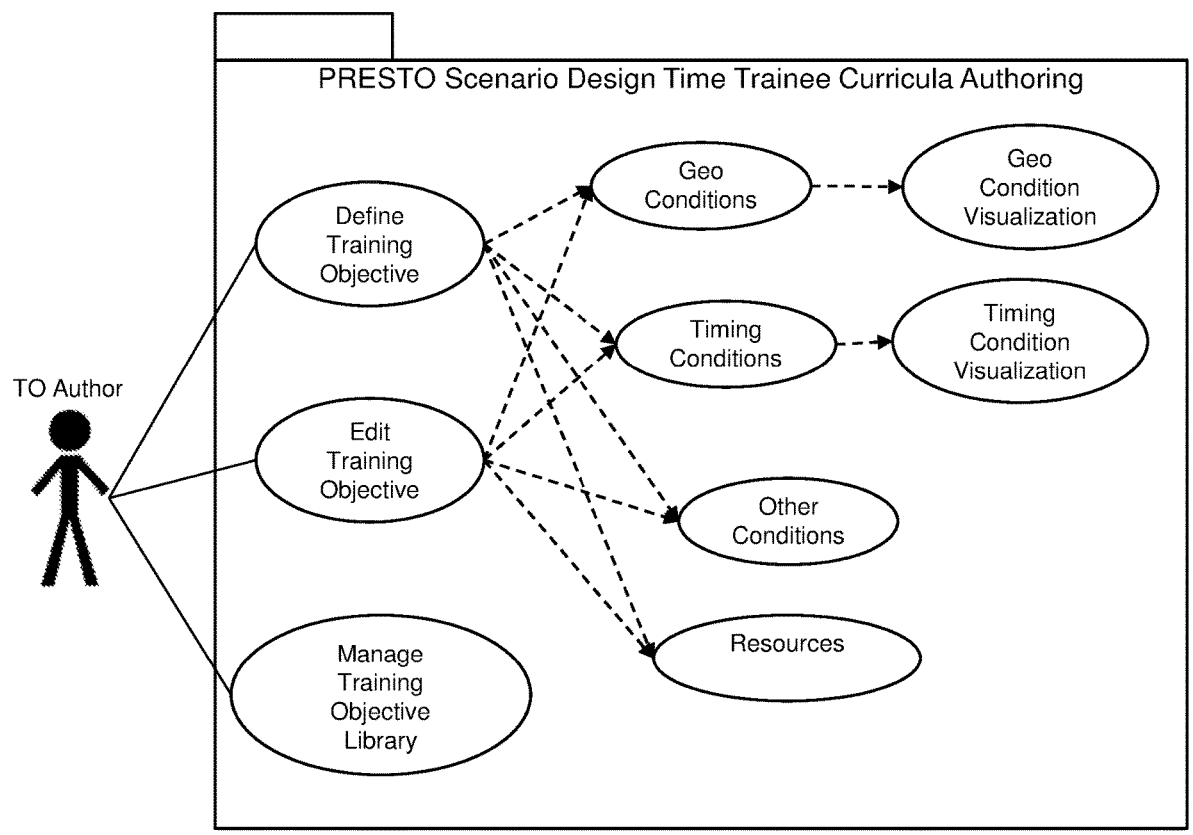
FIG. 14 illustrates an example of use cases for a training objective author.

Training Objective Author: The training objective author defines training objectives and their associated conditions. The use cases for the training objective author are shown in FIG. 14. The training objective author defines and edits the set of pre-conditions necessary for a training objective to occur. These conditions are made up of geospatial, timing and other conditions. Geospatial conditions include distances, ranges and geometrical configurations (such as formations). Geospatial conditions are created using a graphical user interface. The training objective author also defines timing conditions. These conditions describe the time dependencies between training objectives. Examples of these are TO A must precede TO B or TO C must occur concurrent with TO D. The training objective author can also define and edit other training objective conditions such as weather and time of day. These conditions are described using a table of values such as weather: wind greater than 10 kts and time of day: dawn.

The Training Objective Author user has the following top level use cases:

Define Training Objective—create training objectives including the resources the training objective needs (such as a three ship fly in formation training objective needs three helos), timing conditions (such as sensor 1 and sensor 2 must come before sensor fusion), geometric conditions (such as the positioning of the target, the lasing and missile helo in a buddy lasing activity) and other conditions (such as sea state, weather and time of day)

Edit Training Objectives—edit the resources, timing dependencies and other pre-conditions of training objectives Manage Training Objective Library—Once a training objective is defined, it can be stored in a library for reuse. These training objectives can be applied to many trainees across multiple training scenarios.

Scenario Designer: The scenario designer role has two major use cases. The first one involves checking the designed scenario for feasibility (shown in FIG. 15). The second major use case is enhancing the scenario by identifying additional training opportunities in a scenario (shown in FIG. 16). The scenario designer uses PRESTO to help verify that the scenario is feasible with respect to timing conditions and resources. PRESTO uses the MSEL (Master Scenario Event List) as the initial source of the scenario description. Then the conditions for the training objectives represented in the scenario are checked. These include timing conditions and resources needs. For example, if TO B requires TO A to precede it, then if this is not the case in the scenario, then the scenario designer is notified of a feasibility violation. An example of resource needs includes checking to make sure that if a training objective for trainee A needs two other aircraft, that those other aircraft are available at the time trainee A is engaged in that training objective. Finally, the feasibility violation can be displayed to the scenario designer using an annotated MSEL which is color coded to indicate the type of error and the scenario designer can click on the MSEL to drill down into the details of the violation.

Figure 15:
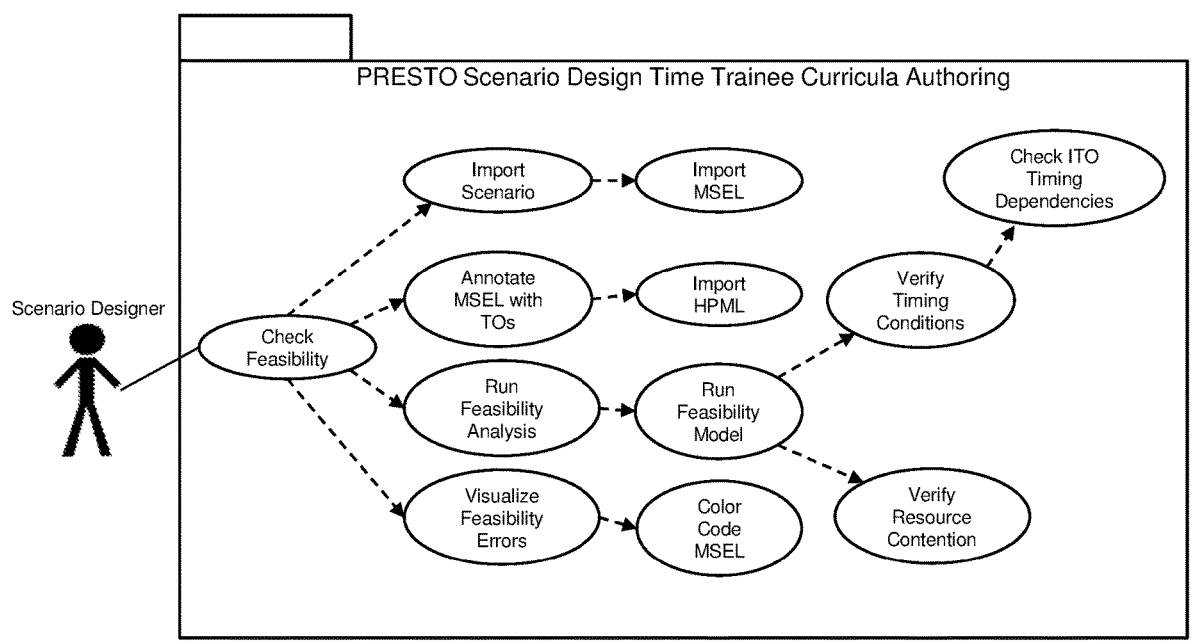
FIG. 15 illustrates an example of use cases for a scenario designer.

The Scenario Designer has the following top level use cases:

Check Feasibility—check the feasibility of the scenario by verifying that scheduled training objectives meet all of their conditions (such as resource requirements and sequence dependencies). The scenario designer does this by importing a scenario, running the PRESTO feasibility analysis function and checking the results. This use case is shown in FIG. 15.

Enhance Scenario—identify areas to increase the training value of the scenario. This includes identifying times where additional training objectives could be added for trainees. This use case is shown in FIG. 16.

Figure 16:
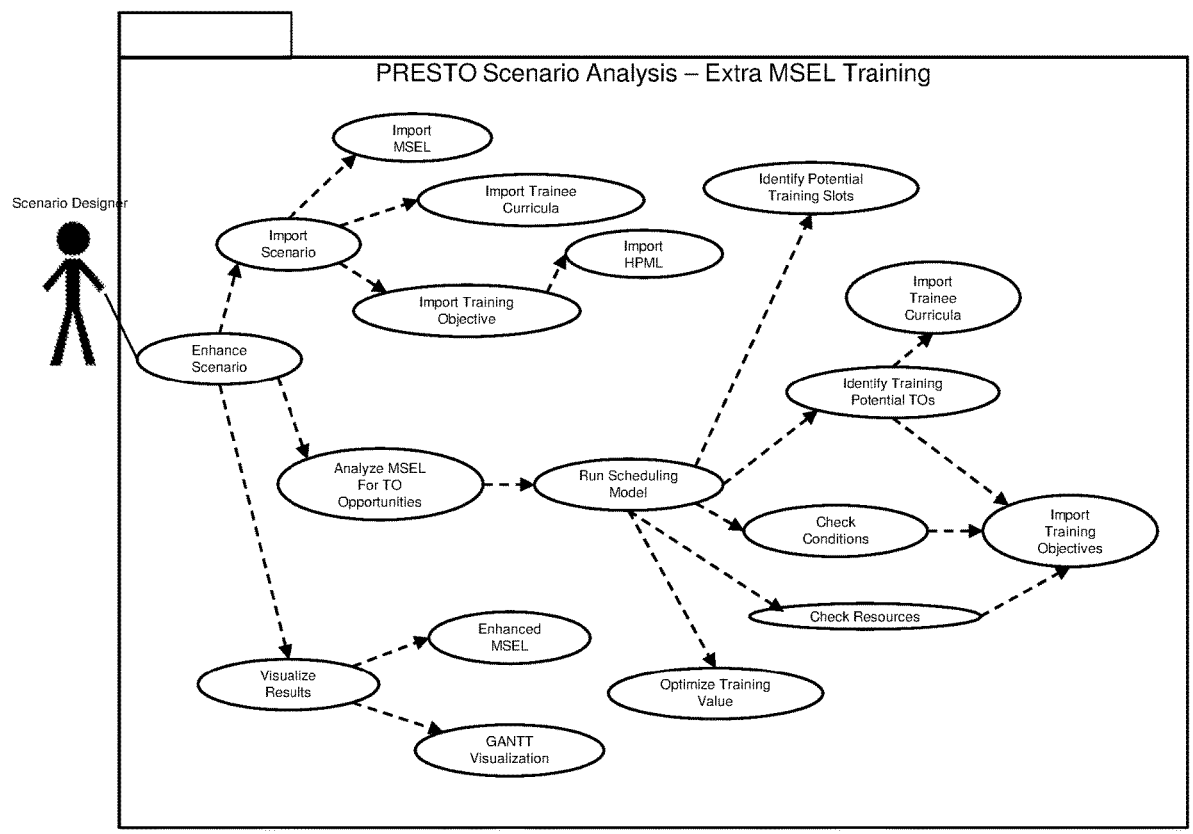
FIG. 16 illustrates another example of use cases for a scenario designer.

FIG. 16 shows the use case for the scenario designer enhancing the MSEL described scenario by identifying additional training objectives that can be inserted into the MSEL without changing any of the existing MSEL events. In this case the scenario designer uses PRESTO to analyze the MSEL described scenario. PRESTO will look for "free time" periods in the scenario where trainees could take on additional training activities. The PRESTO scheduling model will then attempt to schedule trainee associated training objectives into these periods. The schedule will take into account the training objective conditions and resource needs as well as not adversely impacting the previously scheduled training activities for others in the MSEL. The results of this analysis will be displayed to the scenario designer via an annotated MSEL (with color coding as described above) and with a GANTT chart type schedule display.

Figure 17:
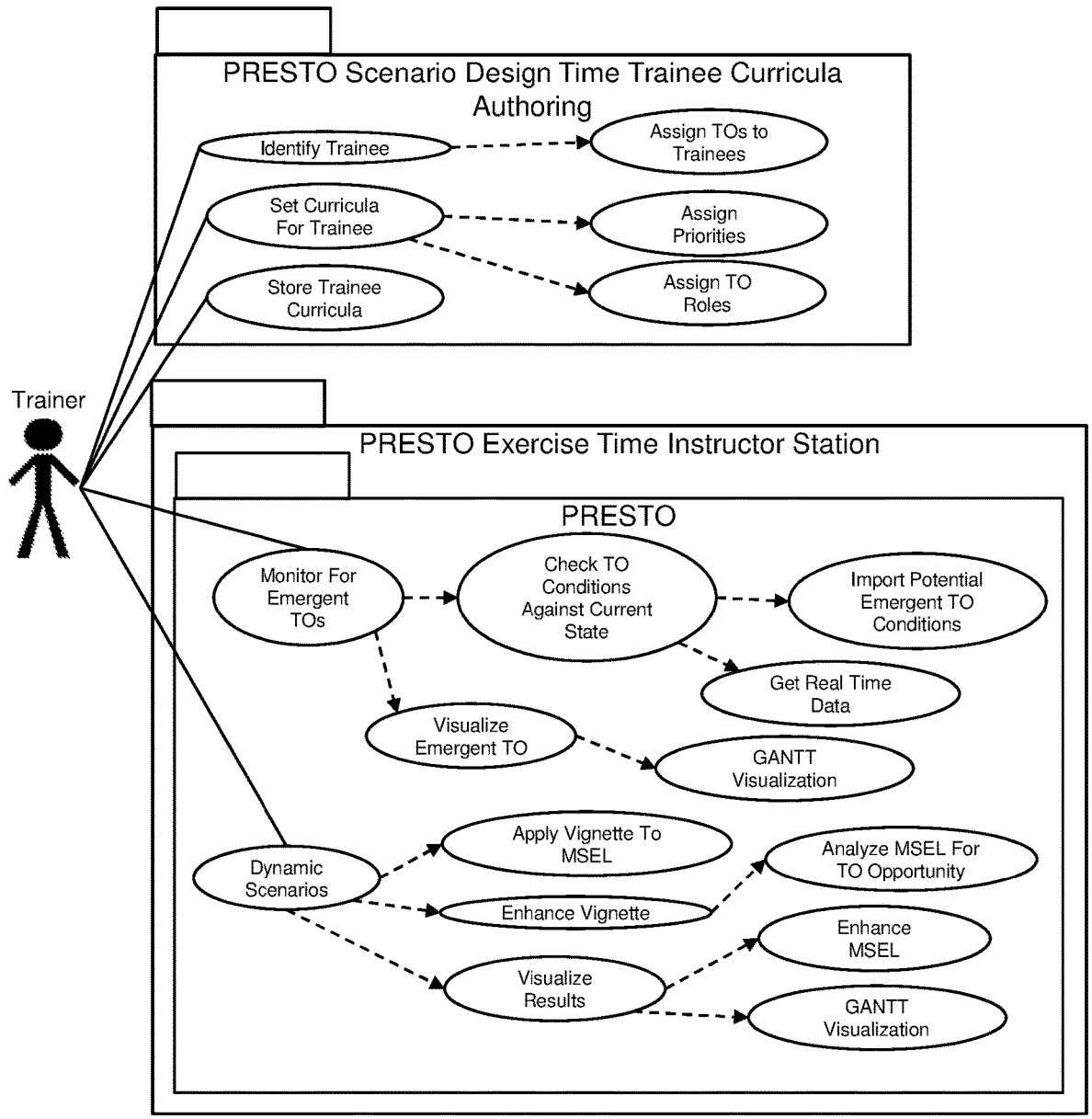
FIG. 17 illustrates an example of use cases for a trainer.

Trainer: The trainer use cases are shown in FIG. 17. The trainer is involved in both the scenario design time and the exercise time. During the scenario design time, the trainer defines the set of training objectives each of the trainees should be working on. During the training exercise, the trainer uses PRESTO to enhance the training opportunities for trainees in two ways. First, PRESTO can identify emergent training objectives which the trainer can approve and which can be carried out by the SAF operator and the trainees. Second, the trainer can enhance dynamic parts of the scenario MSEL. In this case, a section of the MSEL (referred to in the diagram as a vignette) has been dynamically selected based on the trainer or training scenario participant (for example a high ranking officer). This vignette specifies training activities for a number of trainees but might not consider all of the training opportunities for all participants. Similar to the analyze MSEL for training objective opportunities use case for the scenario designer, here the trainer can look for additional training opportunities in real time while the training exercise is in process.

The Trainer has the following top level use cases:

Identify Trainees—identify all of the trainees which will participate in the training exercise Set Curricula For Trainee—define the set of training objectives that the trainee should make progress on. Each training objective has a priority level for the associated trainee.

Monitor For Emergent Training Opportunities—the instructor can monitor the training exercise as it is progressing and identify additional opportunities for training. PRESTO does this by supporting the satisfaction of training objective pre-conditions and by scheduling additional training objectives into trainee schedules when they meet all required conditions.

Dynamic Scenarios—the trainer can incorporate new scenario fragments (called vignettes) into the running scenario to adapt to training needs and conditions as they happen in the scenario. The trainer can analyze the newly added vignette and look for additional training opportunities for all of the participating trainees.

Figure 18:
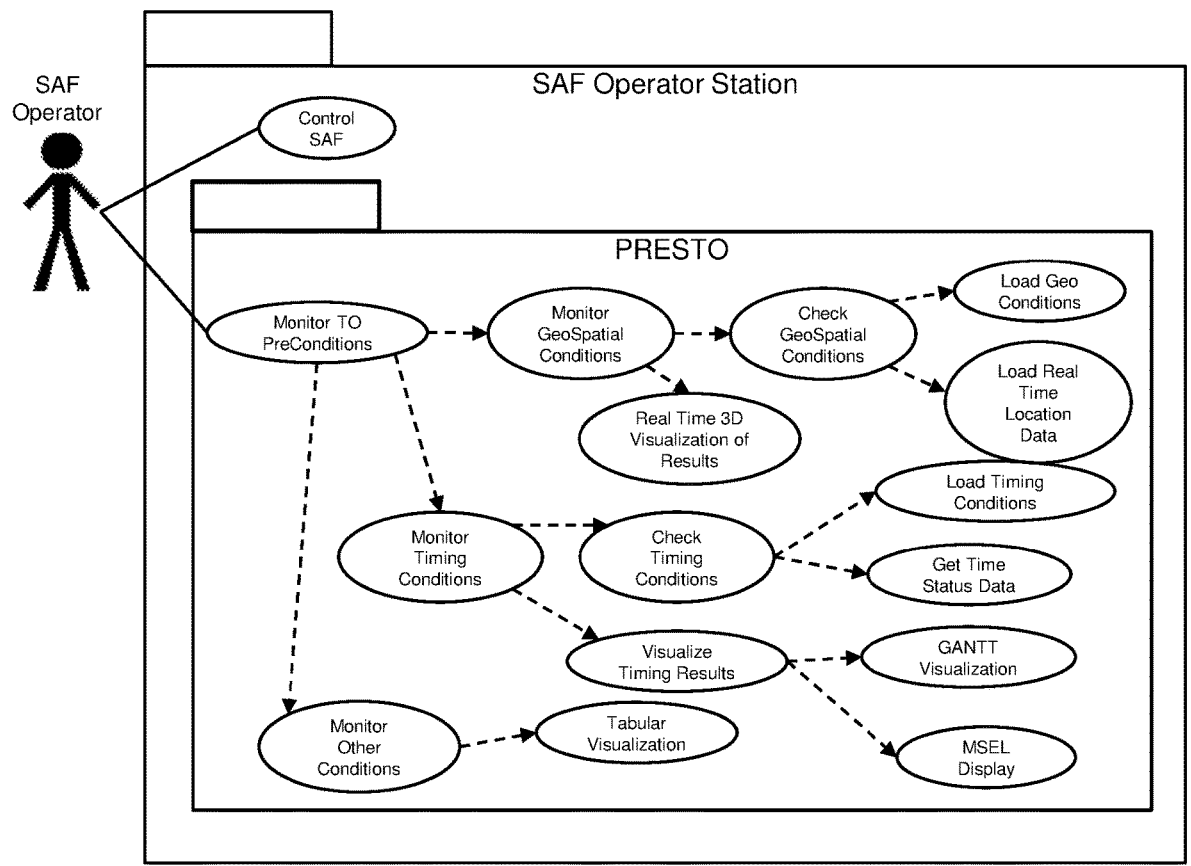
FIG. 18 illustrates an example of use cases for a Semi-Automated Forces (SAF) operator.

SAF Operator: The last role in this embodiment is the SAF (Semi Automated Forces) operator. The use cases for the SAF operator are shown in FIG. 18. The SAF operator monitors conditions for scheduled training objectives during the exercise. If the conditions are in jeopardy of not being satisfied, the SAF operator can intervene to attempt to satisfy the conditions. The SAF operator has several visualizations (timeline/GANTT, 3D map and entities) to monitor and assess the training objective conditions.

The SAF Operator has the following top level use cases:

Control SAF—this use case is provided by the SAF operator station.

Monitor Training Objective Pre Conditions—the SAF operator uses PRESTO to monitor the pre-conditions of training objectives during the training exercise. The SAF operator uses the pre-condition information to help them decide how to manipulate the exercise SAF entities to help satisfy additional training objective pre-conditions. For example, if a trainee is scheduled to work on a sensor training objective which requires a target within a given distance, PRESTO can help the SAF operator monitor this pre-condition to determine if it will be satisfied. If the pre-conditions might not be satisfied, PRESTO can help the SAF operator determine where a target can be moved so that it will satisfy that pre-condition.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

We claim:

1. A method of defining a scenario of conditions for a computer based simulator, said method comprising the steps of:
   an assignment model receiving a plurality of conditions for at least one objective;
   at least one of the plurality of conditions being represented by at least one constraint;
   the at least one constraint comprises a mathematical expression having at least one variable representing a plurality of values of the at least one constraint whereby the at least one of the plurality of conditions can be represented by the plurality of values of the at least one constraint;
   the mathematical expression implemented in a computer program to be executed with a processor;
   the assignment model communicating at least one of the plurality of conditions to a scheduling model;
   the scheduling model scheduling, with a processor, at least one of the plurality of conditions to define the scenario of conditions for a computer based simulation environment by satisfying the at least one objective given the at least one constraint;
   the computer based simulation environment comprises a plurality of networked computer based simulators;
   whereby the scenario of conditions comprises at least one of the plurality of conditions for each of the networked computer based simulators;
   the scheduling model communicating at least one of the plurality of conditions to the computer based simulation environment;
   receiving an actual value of the at least one variable of the at least one constraint from one of the plurality of networked computer based simulators;
   whereby the actual value represents an actual constraint value from a user of one of the plurality of networked computer based simulators;
   the scheduling model rescheduling at least one of the plurality of conditions to define an updated scenario of conditions for the computer based simulation environment by satisfying the at least one objective given the at least one constraint and the actual constraint value; and
   whereby the updated scenario of conditions comprises at least one of the plurality of conditions for each of the networked computer based simulators.

2. The method of claim 1 further comprising presenting at least one of the plurality of conditions to a user interface of the computer based simulator.

3. The method of claim 1 wherein the mathematical expression comprises a mathematical expression having mathematical unknowns representing a range of the plurality of values of the at least one constraint.

4. The method of claim 1 wherein the step of scheduling the plurality of conditions to define a scenario of conditions by satisfying the at least one objective given the at least one constraint comprises automatically sequencing the plurality of conditions to define a scenario of conditions by optimizing the at least one objective using constraint programming.

5. The method of claim 1 wherein:
   scheduling the plurality of conditions to define a scenario of conditions by satisfying the at least one objective given the at least one constraint comprises automatically sequencing the plurality of conditions to define a scenario of conditions by satisfying the at least one objective using constraint programming;
   the objective comprises at least one training objective; and
   the plurality of conditions comprises one condition selected from the group consisting of:
      a length of the scenario of conditions, and
      a quantity of the plurality of conditions.

6. The method of claim 1 wherein a value of the at least one constraint represents a skill of an entity.

7. The method of claim 1 further comprising transforming a plurality of physical conditions to define the plurality of conditions for the at least one objective.

8. A method of defining a scenario of conditions for a computer based simulator, said method comprising the steps of: an assignment model receiving a plurality of conditions for at least one objective; the plurality of conditions being represented by at least one constraint; the assignment model communicating at least one of the plurality of conditions to a scheduling model; the scheduling model scheduling, with a processor, the at least one plurality of conditions into a scenario of conditions for the computer based simulation environment; wherein the at least one constraint is a mathematical expression representing at least one variable; wherein a value of the at least one variable is a priority; communicating at least one of the plurality of conditions to the computer based simulation environment wherein the computer based simulation environment comprises a plurality of networked computer based simulators; the scheduling model receiving an actual value of the at least one variable of the at least one constraint from one of the plurality of networked computer based simulators; whereby the actual value represents an actual performance value from one of the plurality of networked computer based simulators; and the scheduling model rescheduling at least one of the plurality of conditions to define an updated scenario of conditions for the computer based simulation environment by satisfying the at least one objective given the at least one constraint and the actual value.

9. A computer based system for defining a scenario of conditions or a computer based simulator, the system comprising: an assignment model configured to receive a plurality of conditions for at least one objective; at least one of the plurality of conditions being represented by at least one constraint; the at least one constraint comprises a mathematical expression having at least one variable representing one or more values of the at least one constraint whereby the at least one of the plurality of conditions can be represented by more than one value of the constraint; the mathematical expression implemented in a computer program; a means to communicate at least one of the plurality of conditions to a scheduling model; the scheduling model configured to schedule the plurality of conditions to define the scenario of conditions for a computer based simulation environment by satisfying at least one objective given the at least one constraint; the computer based simulation environment comprises a plurality of networked computer based simulators; a means to communicate at least one of the plurality of conditions to the computer based simulation environment; a means to receive an actual value of the at least one variable of the at least one constraint from one of the plurality of networked computer based simulators; whereby the actual value represents an actual performance value from one of the plurality of networked computer based simulators; and the scheduling model configured to reschedule at least one of the plurality of conditions to define an updated scenario of conditions for the computer based simulation environment by satisfying the at least one objective given the at least one constraint and the actual value.

10. The computer based system of claim 9 wherein:
the means to schedule the plurality of conditions to define the scenario of conditions further comprises optimizing the objective using constraint programming;
the at least one objective comprises at least one training objective; and
the at least one plurality of conditions comprises one condition selected from the group consisting of:
a length of the scenario of conditions, and
a quantity of the plurality of conditions.

11. The computer based system of claim 9 wherein the objective is an educational objective.

12. The method of claim 1 wherein:
receiving a plurality of conditions for at least one objective comprises receiving a plurality of conditions for a first objective and a second objective; and
scheduling the plurality of conditions to define a scenario of conditions given the at least one objective comprises automatically sequencing the plurality of conditions to define a scenario of conditions given the first objective, the second objective and the at least one constraint.

13. The method of claim 3 further comprising determining the one or more values of the mathematical unknowns representing the at least one of the plurality of conditions.

* * * * *